(12) United States Patent
Marchant

(10) Patent No.: US 6,240,183 B1
(45) Date of Patent: *May 29, 2001

(54) SECURITY APPARATUS FOR DATA TRANSMISSION WITH DYNAMIC RANDOM ENCRYPTION

(76) Inventor: Brian E. Marchant, 285 Grand View Dr., Woodside, CA (US) 94062

( * ) Notice: Subject to any disclaimer, the term of this patent is extended or adjusted under 35 U.S.C. 154(b) by 0 days.

This patent is subject to a terminal disclaimer.

(21) Appl. No.: 09/419,337

(22) Filed: Oct. 15, 1999

Related U.S. Application Data

(63) Continuation-in-part of application No. 09/359,857, filed on Jul. 23, 1999, now Pat. No. 6,094,486, which is a continuation-in-part of application No. PCT/US98/12578, filed on Jun. 15, 1998.
(60) Provisional application No. 60/050,176, filed on Jun. 19, 1997.

(51) Int. Cl.⁷ .................................................. H04L 9/00
(52) U.S. Cl. ........................ 380/28; 713/184; 713/171; 713/202; 380/42
(58) Field of Search .................... 380/28, 42, 52, 380/259, 260, 264, 268, 201; 713/162, 192–193, 171; 711/219–220

(56) References Cited

U.S. PATENT DOCUMENTS

| | | |
|---|---|---|
| 4,799,258 | 1/1989 | Davies . |
| 5,146,500 | 9/1992 | Maurer . |
| 5,199,069 * | 3/1993 | Barrett et al. ........................ 380/28 |
| 5,245,658 * | 9/1993 | Bush et al. ............................ 380/28 |
| 5,440,640 | 8/1995 | Anshel et al. . |
| 5,452,358 * | 9/1995 | Normile ................................ 380/42 |
| 5,517,614 * | 5/1996 | Tajima et al. ........................... 714/1 |
| 5,548,648 * | 8/1996 | Yorke-Smith ...................... 713/193 |
| 5,623,637 | 4/1997 | Jones et al. . |
| 5,724,423 | 3/1998 | Khello . |
| 5,742,686 * | 4/1998 | Finley ................................... 380/28 |
| 5,751,808 | 5/1998 | Anshel et al. . |
| 5,778,071 | 7/1998 | Caputo et al. . |
| 5,832,091 | 11/1998 | Tomko et al. . |

FOREIGN PATENT DOCUMENTS

| | | |
|---|---|---|
| 0797329 A1 | 9/1997 | (EP) . |
| PCT/US98/12578 * | 6/1998 | (WO) . |

* cited by examiner

*Primary Examiner*—Gail Hayes
*Assistant Examiner*—Ho S. Song
(74) *Attorney, Agent, or Firm*—Oppenheimer Wolff & Donnelly, LLP

(57) ABSTRACT

A data encryption/decryption apparatus is disclosed which includes a controller coupled to an array of random data, an encryptor/decryptor and a plurality of encryption/decryption algorithms. The array of random data and the plurality of encryption/decryption algorithms are stored on an electronically readable media. The data encryption/decryption apparatus can encrypt and decrypt data, video, audio. The electronically readable media includes random access memory, read only memory, magnetic media, optical media, magneto-optical media, CDROM, digital video disk (DVD), hard disk, a remote computer memory storage location accessible via an electronic network such as a telephone system or a computer network, or any other electronically readable media method. The controller is responsive to a key code input to the controller. The controller determines a first computed address in the array of random data and a control data length. The controller then retrieves the control data from the first computed address in the array of random data.

20 Claims, 16 Drawing Sheets

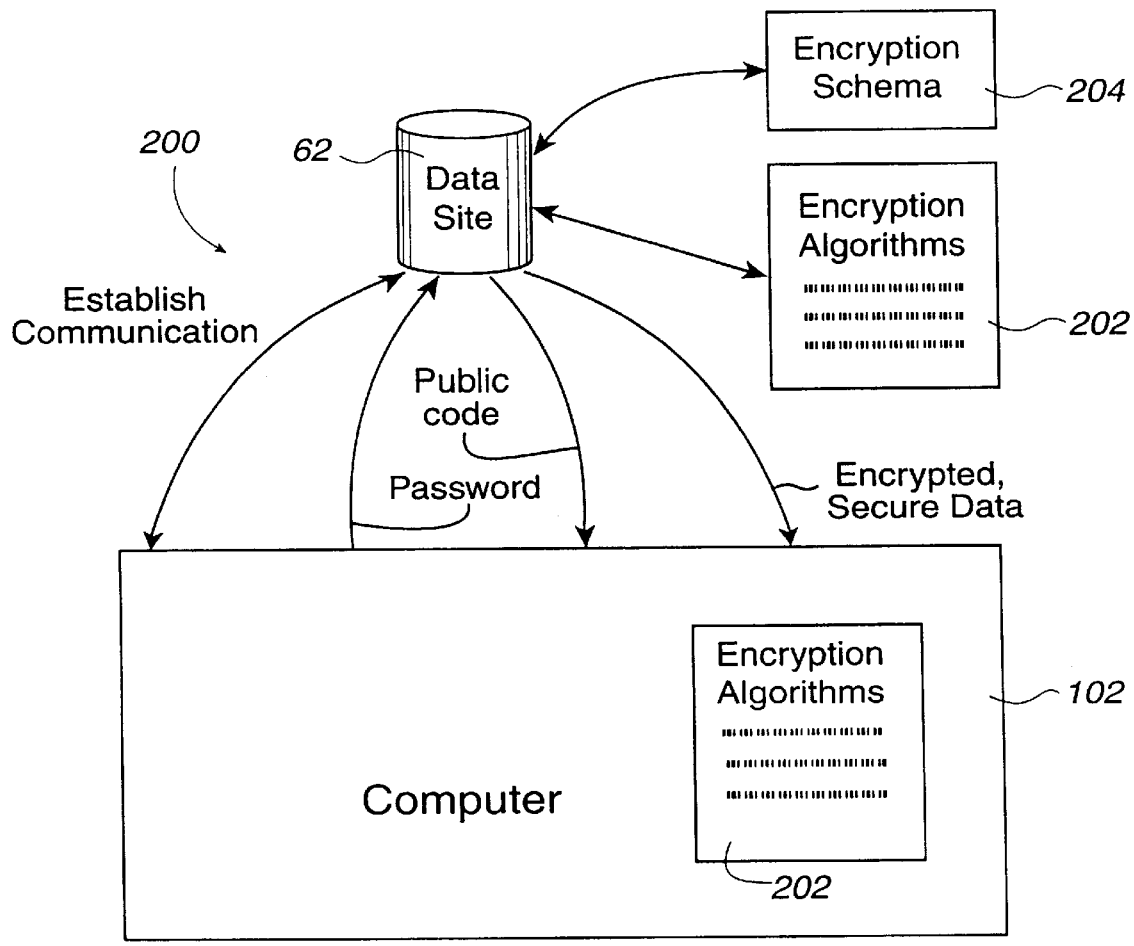
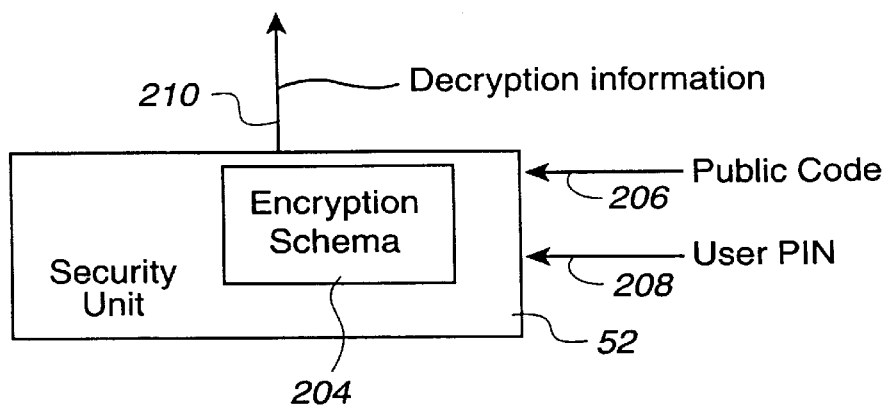
Fig. 4

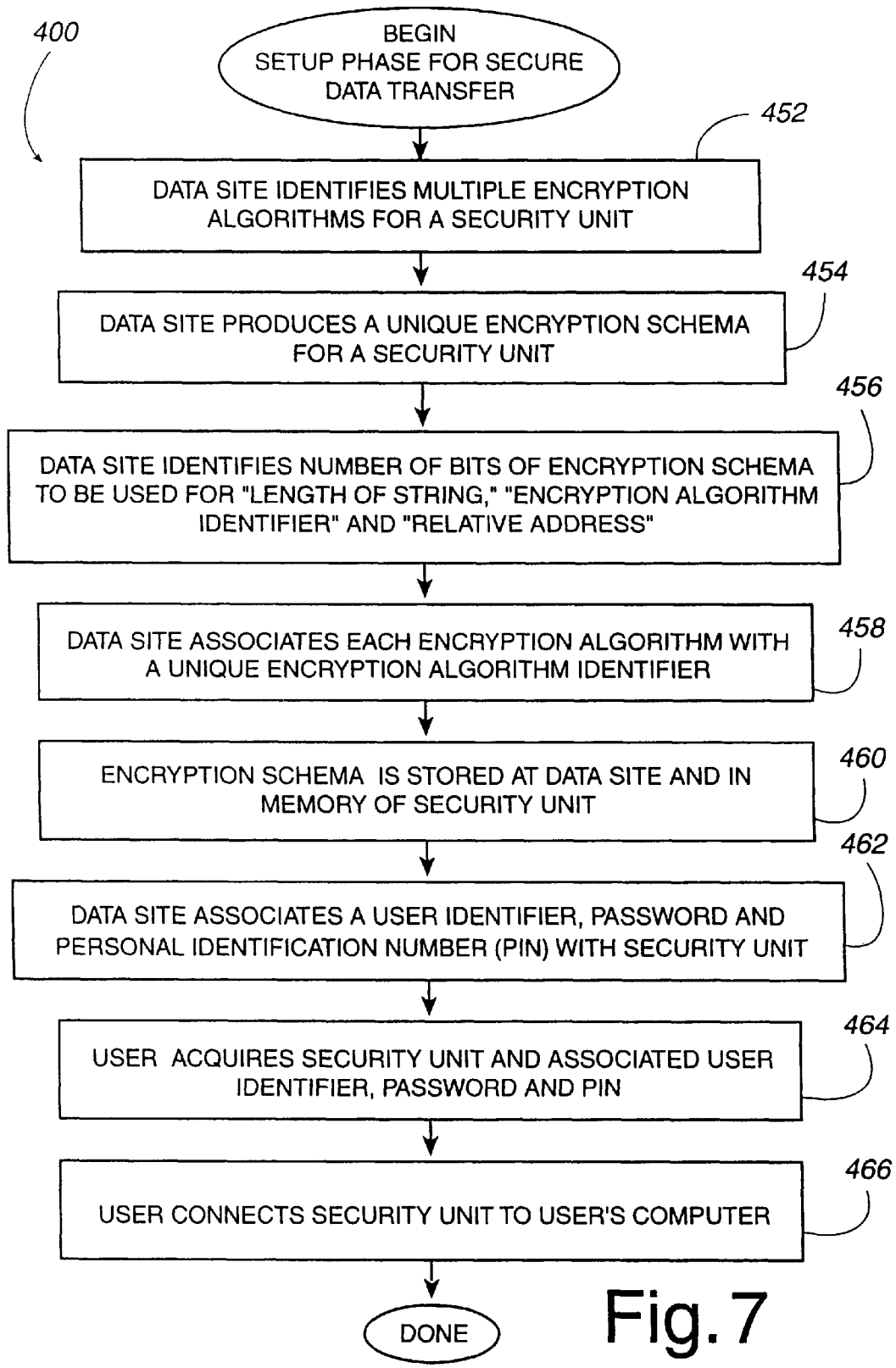

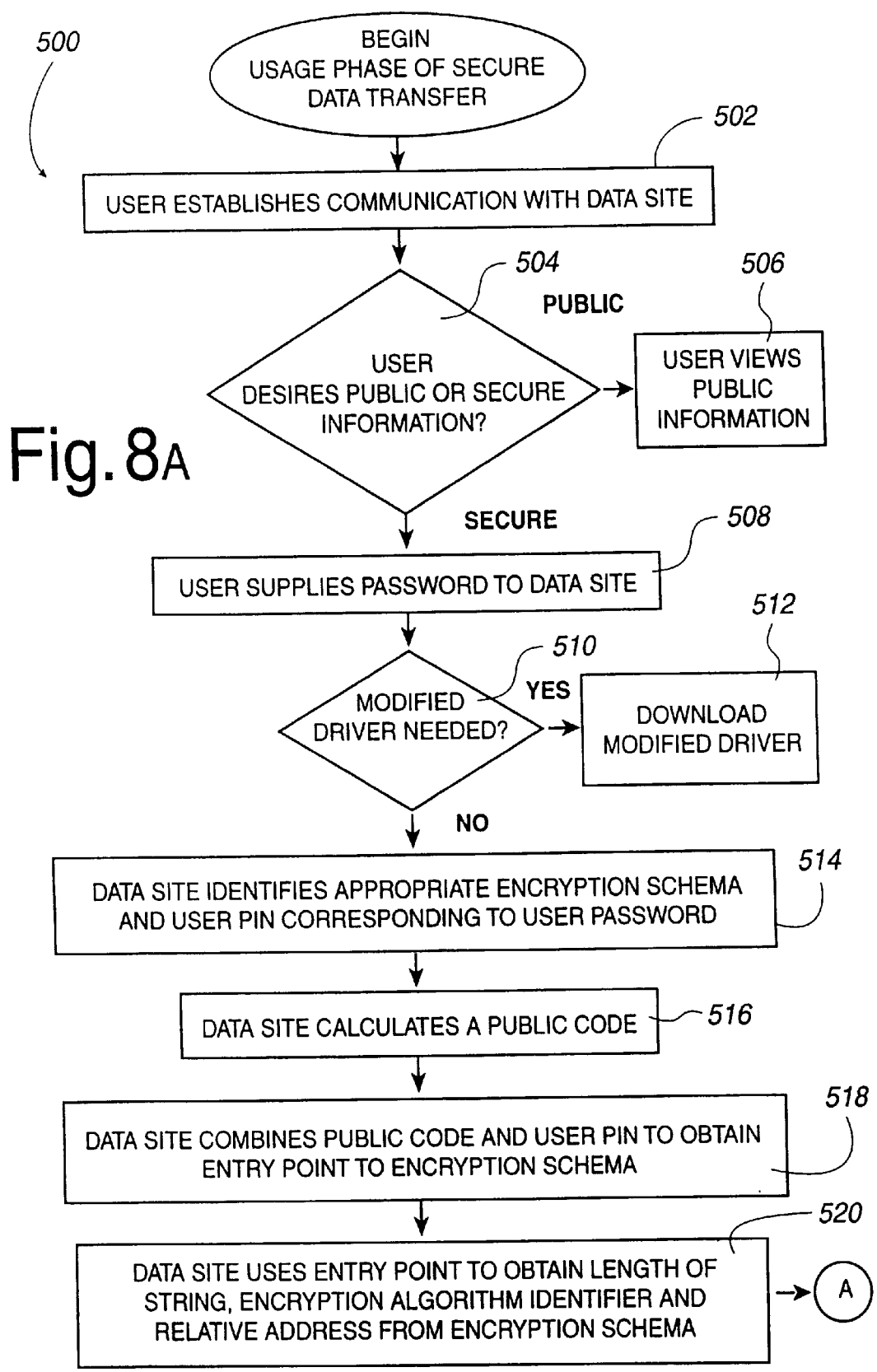

SECURITY APPARATUS FOR DATA TRANSMISSION WITH DYNAMIC RANDOM ENCRYPTION

CROSS REFERENCE TO RELATED APPLICATIONS

The present application is a continuation in part of prior application Ser. No. 09/359,857 filed Jul. 23, 1999 now U.S. Pat. No. 6,094,486 which represents the National Phase filing of International Application No. PCT/US98/12578 filed Jun. 15, 1998, which application claims priority of U.S. Provisional Application No. 60/050,176 filed Jun. 19, 1997, under 35 U.S.C. §119(e), the subject matter disclosed therein being incorporated herein by reference in its entirety.

DESCRIPTION

1. Technical Field

The present invention relates generally to transmission of data in a secure fashion between computer systems. More specifically, the present invention relates to a portable security apparatus that attaches to a computer and makes use of random encryption algorithms that change.

2. Background Art

Within any computing system or within any network, data is often transmitted between two points such as between a server computer and a user's host computer. At times, this information may be transmitted over a local area network (LAN), a wide area network (WAN), over a corporate Intranet or Internet, and also over the Internet. Because data transmission makes use of a variety of media such as cables, telephone wires, microwaves, satellites, etc., the security of the data is often at risk when it is transmitted. In other words, when confidential or private information is being transmitted there is always a risk that the information can be read by unauthorized users.

In addition, there is the problem of an unauthorized user masquerading as the true user of the information, and thus receiving information that he or she is not authorized to view. Thus, confidential information needs not only a secure form of transmission, but also a technique for ensuring that the end recipient is authorized to view such information. A variety of secure transmission techniques rely upon data being encrypted by a complex, single encryption algorithm. However, relying upon only one encryption algorithm for transmission of data is somewhat risky in that the encryption algorithm may eventually be broken. Other techniques change an encryption key on a monthly or daily basis, or upon some outside event; however, these encryption algorithms are still subject to be broken for any given message. Furthermore, many of these techniques store a fixed encryption algorithm and an encryption key within the user's computer. Such techniques are also at risk because a computer hacker may be able to break into the user's computer and retrieve such an encryption algorithm and key and/or any password or personal identification number (PIN) that may be used as an encryption key. If the fixed encryption algorithm is obtained, a hacker may be able to read unauthorized data.

Therefore, a simple, easy to use, portable and inexpensive data security module and technique is desired that allows for secure transmission of data and that does not suffer any of the drawbacks of the prior art.

DISCLOSURE OF THE INVENTION

To achieve the foregoing, and in accordance with the purpose of the present invention, a security unit and technique is disclosed that attaches outside of a user's computer and assists in decrypting encrypted information using random encryption algorithms that may change frequently within the body of a single message.

The security unit attaches conveniently to an easily accessible port of a laptop or desktop computer and includes an encryption schema which is a random array of bits. The same encryption schema is also stored at the data site where the secure data originates before it is transmitted to the user's computer. A personal identification number (PIN) is known only to the data site and to the user, and is not transmitted with the secure information. The data site uses a public code combined with the PIN to randomly access the encryption schema in order to determine not only which encryption algorithm to use, but also to determine how many bytes of the message to transmit using that encryption algorithm. Once a number of bytes are sent using a random encryption algorithm, the data site changes to a new random encryption algorithm for another set of bytes whose length is also randomly determined. Once the encrypted message is sent to the user (or at any time), the user in a similar fashion uses the public code and the secret PIN in order to access the encryption schema within his security unit in order to determine not only which encryption algorithm to use, but also to determine how many bytes should be decrypted using that encryption algorithm. The encryption algorithm may also change randomly during the message based upon random bits within the encryption schema The present invention provides a variety of advantages over the prior art. In one embodiment, the security unit is external to the computer, thus preventing any hacker who can gain access to the computer from gaining access to the encryption schema or PIN stored within the security unit. By plugging into a port of the computer, the security unit is still able to provide decryption information to the computer, yet the encryption schema stored within the memory of the external security unit is not able to be read by anyone gaining unauthorized access to the computer itself. In other words, the encryption schema that defines which encryption algorithm to use and how many bytes to decrypt using that algorithm along with the user's PIN is not retained within the computer. In one particular embodiment, the security unit conveniently plugs into a mouse port located near the front of the computer system, thus allowing convenient attachment. Also, an external unit allows the security unit to be extremely portable and attachable to any suitable computer.

In addition, the security unit is a simple device enabling it to be built inexpensively and small, which means it is more portable. The unit is especially useful for business travelers who need to access large amount of corporate information while on the road. The unit is portable, and the encryption technique used is suitable for the security of large amounts of information.

Also, the security unit does not need an enormous amount of processing power that is sometimes required with other complex encryption techniques. The actual decryption of an encrypted message is performed on the CPU of the host computer, although identification of which encryption algorithm to use and how many bytes to decode using each algorithm is determined externally in the security unit. Also, the security unit does not need its own clock or battery power. The security unit is able to draw any needed power from a pin of the port to which it is attached. Because the present invention uses random algorithms, it does not need to rely upon a clock to provide a time element for computing either an algorithm or a key.

Because the user PIN is only present at the data site and in the user's head and is never transmitted over a network, any encrypted message is more difficult to decrypt by unauthorized people. Furthermore, although the PIN is entered into the security unit, the PIN is never transmitted into the host computer. Also, in one particular embodiment, the PIN is entered first onto the security unit and the public code is entered second. Thus, upon entering the public code the PIN is removed from the outside of the security unit. Thus, the PIN is never left unprotected on the outside of the security unit.

Having a unique encryption schema per security unit also has advantages. Although it is contemplated that any number of security units distributed to multiple users might use the same encryption schema, for higher security it may be desirable to have a unique encryption schema for every security unit. The encryption schema is a random array of bits that provides for even higher security in choosing an encryption algorithm and for choosing how many bytes of a message to encrypt using an algorithm. A combination of the public code and the PIN provide a first random entry into the encryption schema. From this entry point, a random set of bits identify a particular encryption algorithm to use for decryption, and a random set of bits identify how many bytes of the message to decrypt using that algorithm. Because these bits are random, the encryption algorithm chosen for a portion of the message is entirely random and it is difficult to break this code. Also, because the random bits also identify a length of string to encrypt, the encryption algorithm changes randomly within a given message at random points within that message. Thus, the encryption algorithm changes within a given message, but this change is completely random and is not transmitted over the network or along with the encrypted message. Using a random choice of encryption algorithms on a randomly chosen length of a string results in a code that is nearly impossible to break.

Furthermore, a reset feature allows a user to reset the encryption process if a message is unreadable for any reason. Additionally, the data site itself may force a reset, provide a new public code and/or require the user to reenter his PIN in order to provide a greater level of security. In addition, it is contemplated that secure data may not only be sent from a data site to a user's computer, but also from a user's computer to the data site or to other computers and/or mass storage devices.

BRIEF DESCRIPTION OF THE DRAWINGS

FIG. 4 illustrates symbolically the flow of information between a data site and a computer and between the computer and a security unit.

FIG. 7 is flow chart illustrating an embodiment of a setup phase for secure data transfer using the security unit of the present invention.

FIGS. 8A and 8B are flowcharts illustrating an embodiment of a technique by which secure data is transferred to a computer and is decrypted with the assistance of a security unit of the present invention.

BEST MODES FOR CARRYING OUT THE INVENTION

Figure 1:
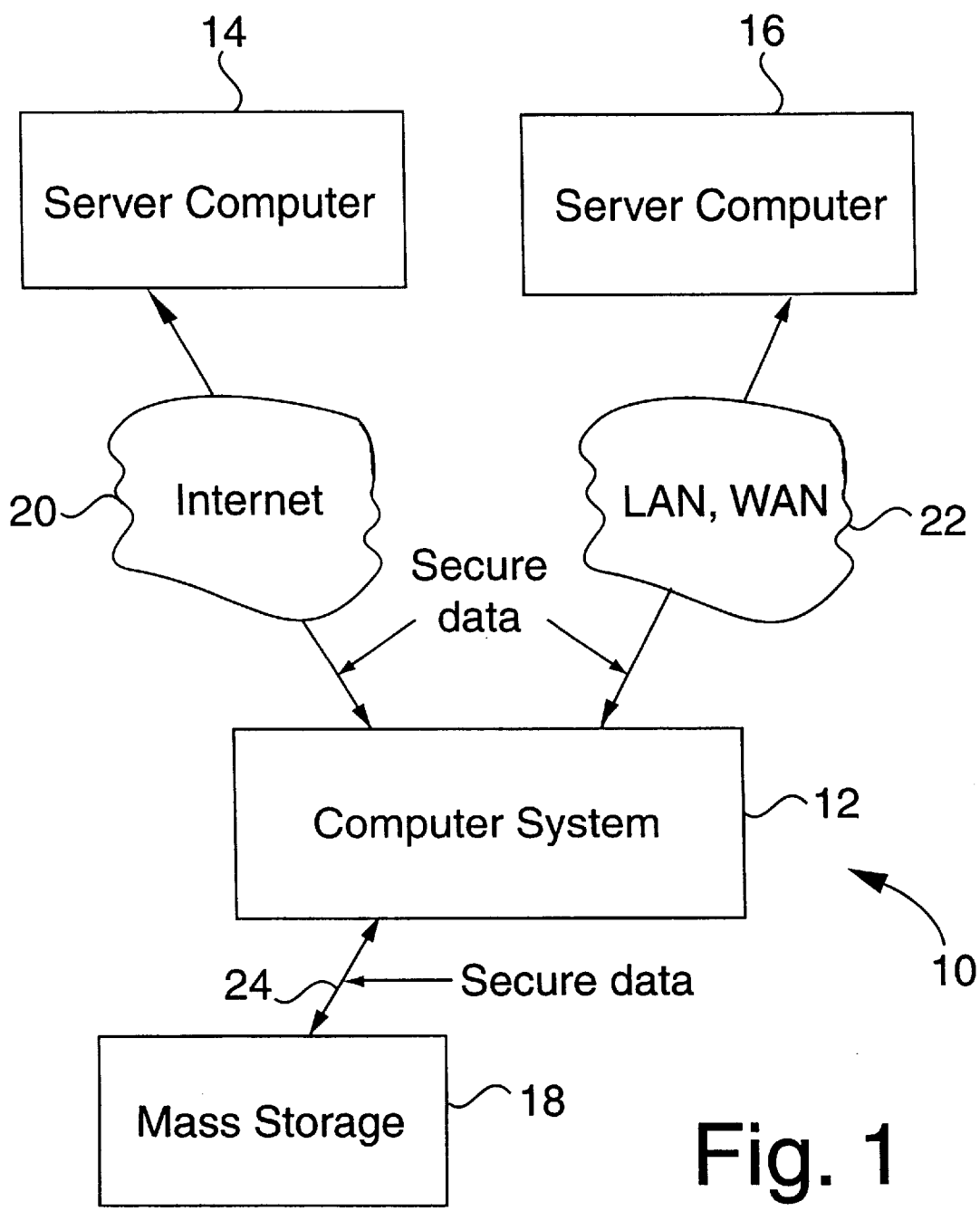
FIG. 1 is a block diagram of a computer system engaging in secure data communications with other devices while using an embodiment of the present invention.

FIG. 1 illustrates a scenario 10 in which a computer system 12 is involved in a variety of secure communications with a server computer 14, a server computer 16 and mass storage 18. Computer system 12 uses a security unit of the present invention in order to receive any encrypted messages from any of the server computers and/or mass storage and to decrypt these encrypted messages with assistance from the attached security unit. Encrypted messages may also be sent from computer system 12 to any of the server computers and/or mass storage devices and be decrypted within those devices by using an equivalent of the security unit.

Computer system 12 that receives and/or transmits encrypted messages may be any suitable computer system including a workstation, a desktop computer, a laptop computer, a portable computer, a personal digital assistant (PDA) (such as those made by Apple Computer, Inc., U.S. Robotics, Inc., etc.), a cellular telephone, a digital handset using personal communication services (PCS) or other wireless device, or any other computing device which has a need for receiving or transmitting secure information.

Server computer 14 may be any suitable computer used to provide information over a network such as an Internet 20. Such an Internet 20 may be a corporate Internet or corporate Intranet or even the current world-wide Internet. Server computer 16 is any suitable computer attached to a local area network (LAN) or to a wide area network (WAN) 22 that can provide information. Mass storage device 18 may be any suitable device for storing information and for transmitting information over an interface 24 to computer system 12. Mass storage 18 may be a floppy disk drive, a hard disk drive, a CD-ROM, an optical disk drive or any similar device.

Although the present invention may be used by a computer system to not only receive encrypted information but also to transmit encrypted information, the following description refers to that aspect of the invention in which a computer system receives encrypted information and is able to decrypt that information by way of assistance from the security unit.

Figure 2:
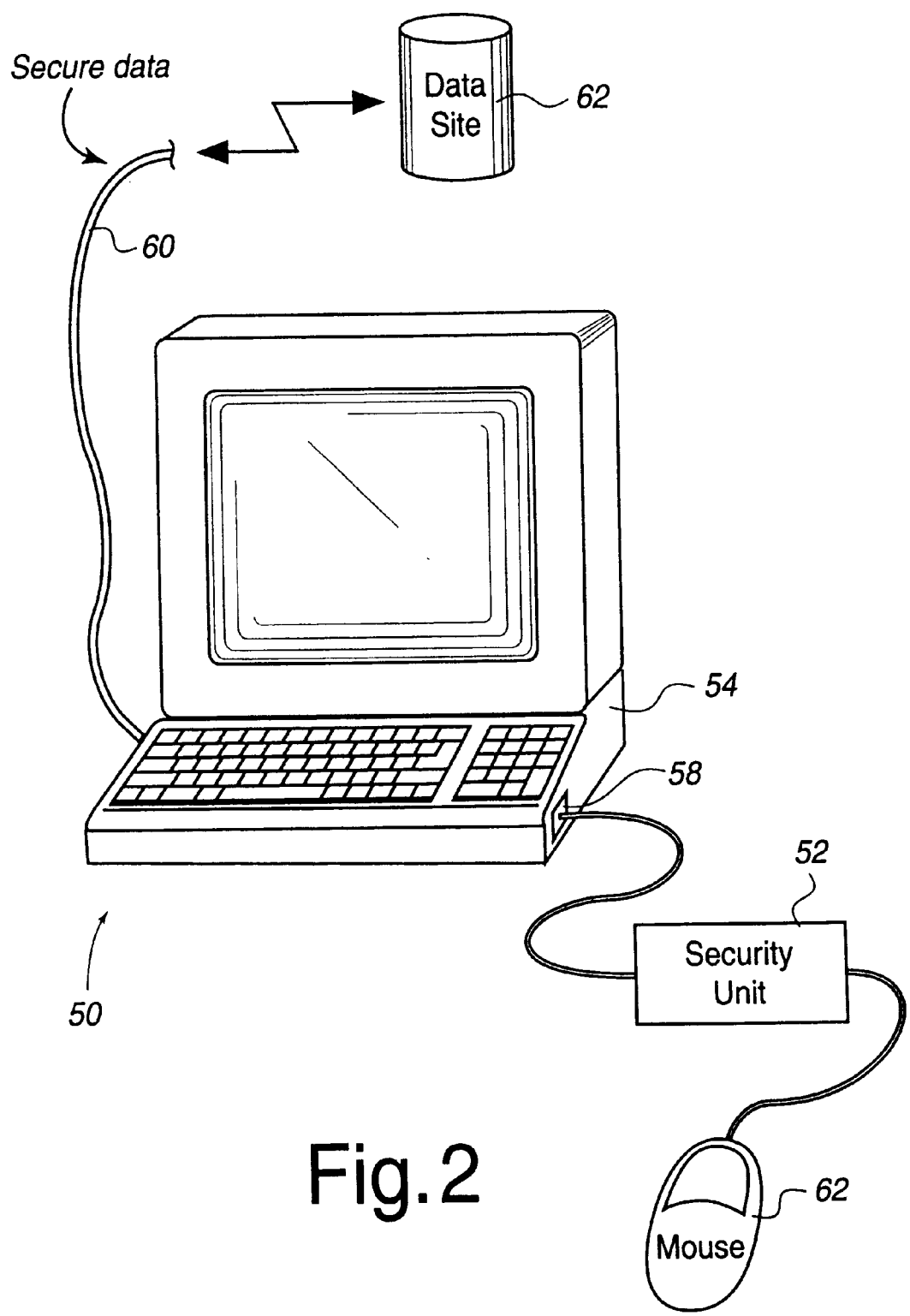
FIG. 2 illustrates an embodiment of the invention in which a security unit attached to the mouse port of a laptop computer assists in decrypting secure data provided from a data site.

FIG. 2 illustrates an embodiment of a computer system 50 in which the security unit 52 of the present invention is attached between a laptop computer 54 and a mouse 56. In this example, security unit 52 attaches to mouse port 58 of the laptop computer which is conveniently located towards the front of the computer. Computer 54 communicates via a data link 60 in order to receive secure information from a data site 62. Data site 62 may be present within any of the server computers of FIG. 1 or may be equivalent to mass storage 18 of FIG. 1. Data link 60 may take a wide variety of forms. By way of example, data link 60 may be a standard cable, an infrared communication link, a telephone line link, a satellite link, a microwave link, or any type of wireless link such as a Ricochet wireless modem provided by Metricom, Inc. Once that encrypted information has been transferred from data site 62 to computer 54, then security unit 52 is able to provide secret encryption information to computer 54 in order to enable the computer to decrypt the information from the data site.

Figure 3:
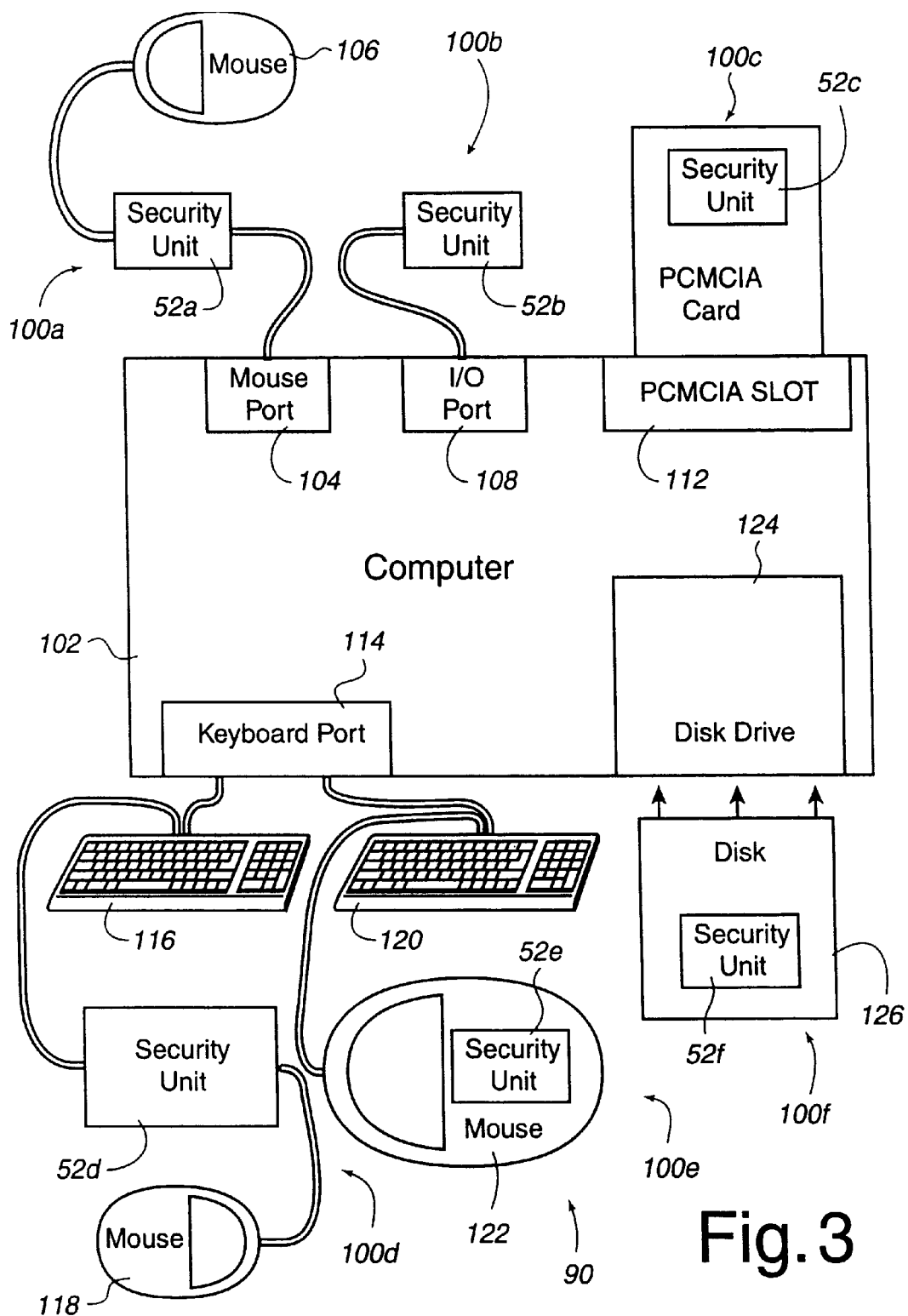
FIG. 3 illustrates various embodiments of the invention in which the security unit may attach to a computer in a variety of ways.

FIG. 3 illustrates a variety of embodiments 90 in which any of security units 100a through 100f attach to a computer 102. FIG. 3 shows multiple security units 52a through 52f to illustrate the variety of ways in which a security unit may communicate with a computer; in actual operation only one security unit is required. In embodiment 100a security unit 52a attaches to computer 102 in between mouse port 104 and mouse 106. During normal use, signals from mouse 106 pass through the security unit to the computer. When data is to be decrypted within the computer, the mouse button of mouse 106 is used to initiate the sending of encryption information from the security unit to the computer. In embodiment 100b security unit 52b is attached by itself to I/O port 108 of the computer. A wide variety of I/O ports may be used for this purpose. By way of example, I/O port 108 may be a serial port, a parallel port, an SCSI port, a PS/2 port, a keyboard port, an infrared port, or any other suitable port. In the embodiment of 100c, security unit 52c is present upon a PCMCIA card 110 that is inserted into PCMCIA slot 112 of the computer.

In the embodiment of 100d a keyboard port 114 of the computer is used and security unit 52d is located between a keyboard 116 and a mouse 118. Embodiment 100e also uses keyboard port 114 to which is attached a keyboard 120, but in this embodiment security unit 52e is present inside mouse 122. In the embodiment of 100f a disk drive 124 of the computer is used to receive a disk 126 on which the security unit 52f is present. Disk 126 may be any suitable disk such as a floppy disk, hard disk, CD-ROM, optical disk, or the like. The security unit may also communicate with the computer not by a direct hardwired link, but also by way of any of the wireless links mentioned above. Thus, it should be appreciated that the security unit may be connected to the user's computer in many different ways, and only a few examples are presented here.

FIG. 4 illustrates a scenario 200 in which encrypted information from data site 62 is decrypted by computer 102 with the assistance of security unit 52. Data site 62 includes the secure information that the user of computer 102 wishes to transfer. Data site 62 also includes access to a set of encryption algorithms 202 and an encryption schema 204. Encryption algorithms 202 are also included in computer 102 and encryption schema 204 is also present within security unit 52. A public code 206 and a user PIN 208 are input to the security unit in order to provide the decryption information 210 to computer 102.

Encryption algorithms 202 may be any suitable set of algorithms used to encrypt information. It is possible that only one encryption algorithm is used to encrypt a message sent from the data site to the computer, although the present invention contemplates that greater data security is provided by using any number of encryption algorithms for different portions of a single message. Encryption algorithms 202 may use bit manipulation, bit substitution, exchanging bits, ORing bits, ANDing bits, character transformation, character movement or any other more complex encryption schemes for encrypting information.

In one embodiment of the invention, an encryption algorithm not only encrypts a string of data in place, but also moves the string to a different location, swapping positions with the string to whose location it moves. The algorithm moves bit strings around so that they no longer are in the sequence or location that they occupied when the message was initially built. Thus, even if an encryption algorithm could be broken for a particular string, the strings within a block of data may be even further jumbled. An encryption algorithm identified in the schema and whose identity is transmitted to the computer would perform the function of moving a string and also manipulating the string. An algorithm may simply move sequences of bits within the string which it is decoding, or it may also move strings of bits within the complete message transmitted. The algorithm would also make use of a memory map to indicate which strings had been moved where and if a string had already been encrypted once or not.

Strings moved forward in the message would be exchanged with a string of equal length at that point. The forward-moving string would not be altered at that time, but instead the exchanged string would be encrypted according to the algorithm, or vice-versa. If it is desirable to only move and/or encode a string once, then the memory map may be consulted to determine if the data at a given point had itself been moved, before allowing it to be exchanged with another string. If it has already been moved, the algorithm can either re-compute string length or position in order to place the string into an unaltered location. The memory map may be built as encryption takes place moving forward through the data message. Such a technique further inhibits hacking of the data message as the encryption is even more dynamic. An encryption algorithm for moving data may treat a data block as circular (i.e., the beginning follows the end), or could keep re-computing a move location until it falls within the data block. Given a known length, a binary division of the move pointer and string length would be a simple and effective solution. Once the data message has been encrypted in such a dynamic way, decryption may be performed by referencing the encryption algorithms used to encrypt the data. Decryption would also build its own memory map locally in much the same way as the encryption process does.

Encryption schema 204 is a random array of bits both used in the encryption of information at the data site and in the decryption of the same information at computer 102. In one embodiment of the invention, encryption schema 204 contains 1M bits of random information in memory. As will be explained in greater detail below in the flow charts of FIGS. 7 and 8, encryption schema 204 is accessed randomly to provide random sets of bits that identify not only an encryption algorithm to use for a portion of the message to be encrypted, but also identify the number of characters or bytes to encrypt using that identified encryption algorithm. Because encryption schema 204 is also present within security unit 52, the computer 102 is able to decrypt the transferred information. Advantageously, neither encryption algorithms 202 nor encryption schema 204 are transmitted from the data site to the computer along with the secure data. There may be one encryption schema used for a variety of users, or there may be a unique encryption schema for each user of a security unit. If so, then a user identifier and/or password is used at the data site to associate a particular user and security unit with its unique encryption schema at the data site.

The user begins by establishing communication between his computer 102 and the data site 62. When the user desires to access secure information, he transmits a password to the data site to permit the data site to identify the unique encryption schema that is also present within the user security unit 52. The data site then generates and transmits a random public code 206 in the clear to computer 102 so that the user may enter the public code into he security unit. At this point the data site encrypts and sends the secure data to computer 102.

Public code 206 is a random sequence of numbers, letters and/or symbols that are generated by data site 62 and transmitted in the clear to computer 102. Once received by computer 102, public code 206 is viewable and may be entered into the security unit by the user. Public code 206 can also be transmitted to the user in other ways. A user also has a unique user PIN which he or she has memorized and has also entered into the security unit. Data site 62 uses a combination of the public code and the unique user PIN to produce a first unique entry point into that encryption schema associated with the user PIN.

Security unit 52 combines public code 206 and user PIN 208 in the same fashion as in data site 62 in order to produce an identical entry point into encryption schema 204. Thus, in this fashion security unit 52 has access to the same set of random bits that data site 62 has used to encrypt the message sent to computer 102. These random sets of bits are sent as decryption information 210 from security unit 52 to computer 102 in order to assist in the decryption of the message. Computer 102 then makes use of this decryption information in conjunction with the encryption algorithms 202 stored within in order to decrypt the data. The setup and usage phases for the transfer of secure information are described in greater detail below with reference to FIGS. 7 and 8. Algorithms 202 may already be present on computer 102 or may be transferred from the data site to the computer independent of the data. Alternatively, algorithms 202 may be present within unit 52 and may be transferred from the unit to the computer for use in decryption. For greater security, algorithms 202 are not transferred along with any message.

Figure 5:
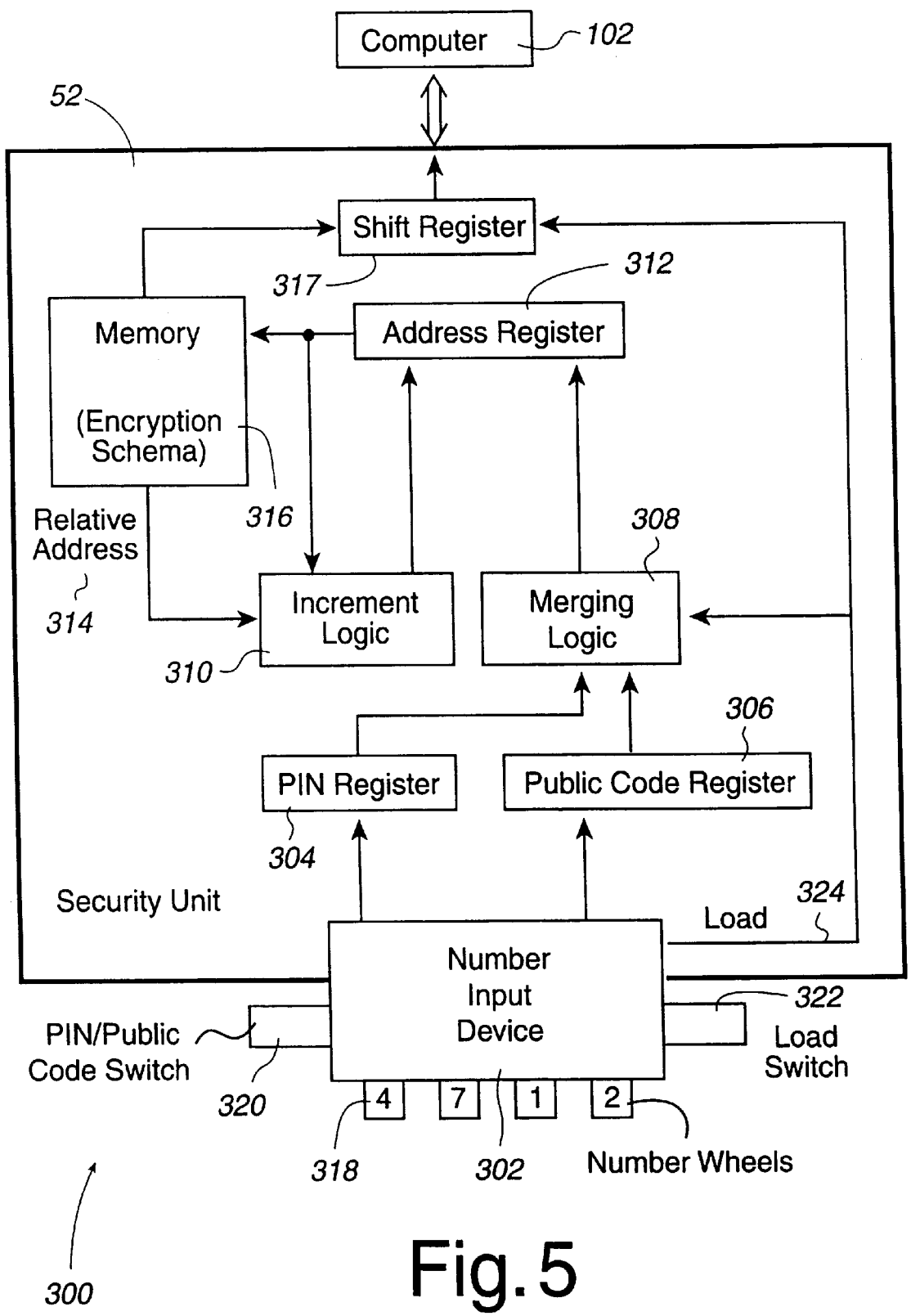
FIG. 5 is a block diagram showing in greater detail one embodiment of the security unit of FIG. 4.

FIG. 5 illustrates an embodiment 300 of a security unit 52 that communicates with computer 102. Security unit 52 includes a number input device 302 for inputting a number into either a PIN register 304 or public code register 306. The contents of these two registers are combined using merging logic 308 in order to produce an address which is stored in address register 312. Increment logic 310 is used to receive the contents of address register 312 and a relative address 314 from memory 316 in order to provide a new address for address register 312. Shift register 317 is used to transfer selected data from memory 316 through to computer 102.

Number input device 302 may be any suitable type of input device used for entering numbers, letters, and/or symbols into security unit 52. In one embodiment of the invention, simple number wheels 318 are used to enter a sequence of numbers. In the example shown, the number "4712" is being entered into the input device. The use of a rotary number wheel or thumb wheels are for illustration only; any other method of selecting numbers may also be used such as buttons, a dial, switches, electronic input, etc. In one embodiment of the invention, a single number input device is used to enter numbers for both PIN register 304 and public code register 306. In this embodiment, a PIN/public code switch 320 is used to select between entering a PIN or a public code. A load switch 322 directs the number present on the input device to be shifted into the register indicated by PIN/public code switch 320. For example, when switch 320 is depressed, then the input number is transferred to PIN register 304 when load switch 322 is activated; when switch 320 is not depressed then the input number is transferred to public code register 306 when load switch 322 is activated. Of course, other hardware and/or techniques may also be used to perform this function. Upon activation, load switch 322 also produces a load signal 324 that directs merging logic 308 to combine the two registers to produce a first address, and also directs shift register 317 to begin shifting the selected algorithms and length of strings from memory 316 to computer 102.

The contents of PIN register 304 and public code register 306 are combined using merging logic 308 in order to produce a unique, random address that indicates a first entry point into the encryption schema contained within memory 316. This first entry point is stored in address register 312. Merging logic 308 may be any type of hardware logic or software that combines registers 304 and 306 in order to produce a first entry point. Memory 316 is any suitable hardware memory that contains the random bits of the encryption schema. Increment logic 310 uses any suitable hardware logic or software in order to add the contents of address register 312 to the received relative address 314 from memory 316 in order to produce a new random address to be stored in address register 312. Relative address 314 may be simply added or subtracted to the current address, or the two addresses may be combined in any fashion to produce a new random address using increment logic 310.

In an alternative embodiment of the invention, the security unit may be implemented in software on the user's computer. In this embodiment, the CPU of the computer in conjunction with various of the computer's input/output devices and memory of the computer would perform the functions of security unit 52. The storage of a PIN, public code, addresses and the logic computation may be accomplished in any suitable programming language. Also, data entry could be from the keyboard or any suitable input device, and the schema could be stored on a floppy or hard disk. A floppy disk including a schema and/or algorithms and/or combining logic would allow for portability from computer to computer, while processing is still performed on a CPU of a host computer.

Figure 6:
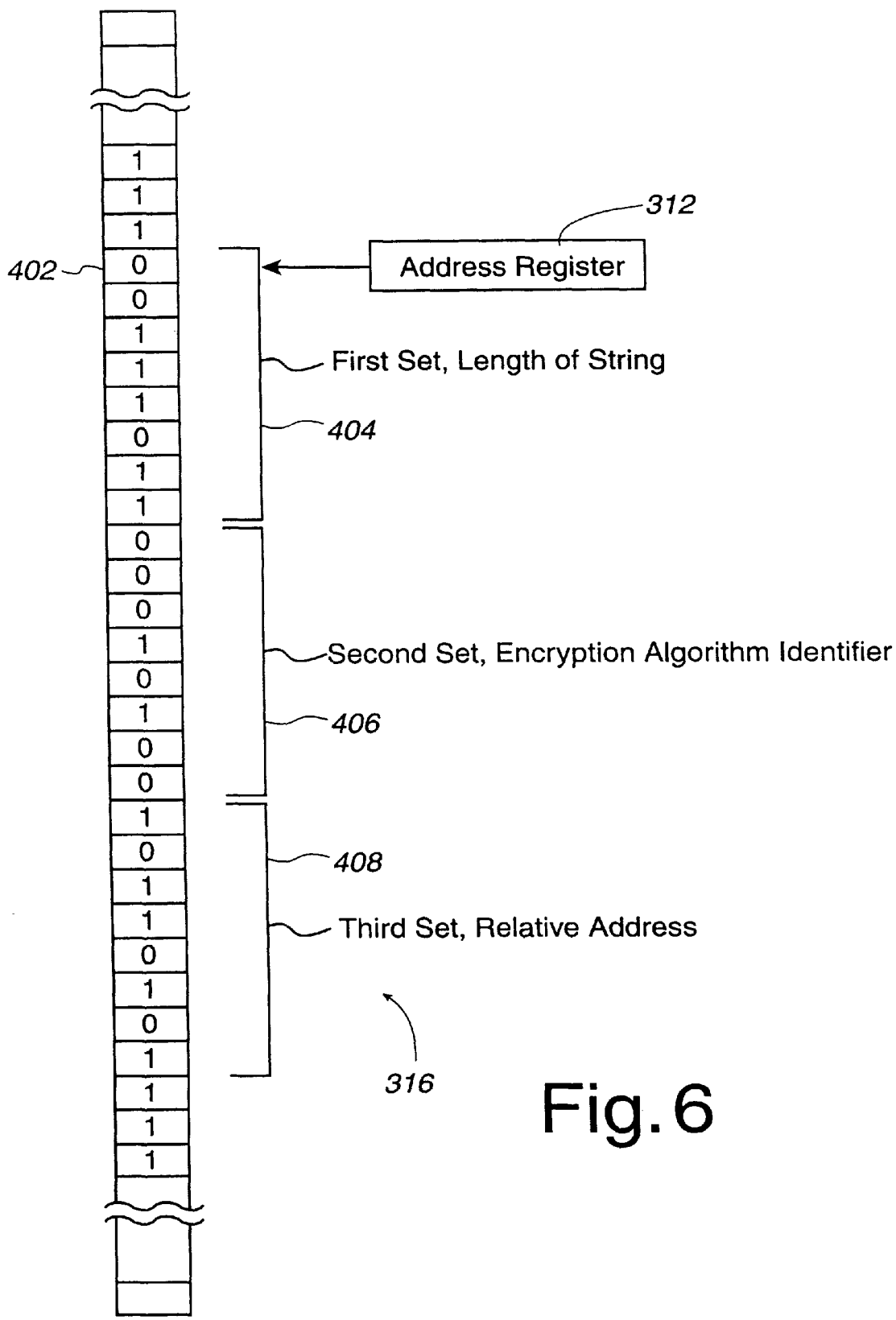
FIG. 6 shows symbolically one embodiment of the contents of the memory of the security unit of FIG. 5.

FIG. 6 shows symbolically memory 316 of security unit 52 of FIG. 5. Memory 316 may be any suitable memory, by way of example, a flash memory may be used. In this illustrative example, memory 316 contains a sequential series of random bits, although memory 316 may be structured in any suitable fashion. Address register 312 indicates an entry point at a random address 402 of memory 316 in order to access random sets of bits for use in encryption and decryption. From address 402 are indicated a first set of bits 404, a second set of bits 406 and a third set of bits 408. In this example, a length of eight bits has been used for each set, although a different number of bits can be used, and each set could be of a different length. Set 404 indicates the length of the string within the message to be encrypted by a particular encryption algorithm. This length could indicate a number of bits, bytes, characters, words, etc. In this example, set 404 indicates a length corresponding to the binary number "00111011". The following second set of bits 406 represents another binary number that indicates an encryption algorithm identifier. This identifier indicates which of many encryption algorithms shall be used to encrypt the string whose length is indicated by set 404. In this example, set 406 indicates an identifier corresponding to the bits "00010100". This identifier is used by a server computer or a host computer to identify an encryption algorithm to use. A third set of bits 408 indicates a random relative address to be used with increment logic 310 in choosing a new random address within memory 316.

It should be appreciated that FIG. 6 is an example only and that by convention these sets of bits may be modified in any fashion. For example, both the data site and the security unit may agree that any other number of bits may be used for each set of bits, and that the sets may appear in any order. Also, the sets of bits need not be consecutive, but may be spaced apart within the memory or may be offset using any agreed upon number or scheme. Also there could be more than three sets of bits and there could be multiple subsets of each set of bits. For example there could be multiple subsets of the first set of bits where each subset identifies a length. The multiple subsets of the first set of bits could be utilized to identify multiple lengths of data strings. Also, multiple subsets of bits of the second set of bits could be utilized to identify multiple encryption algorithms. The multiple subsets of the second set, for example, may be utilized to perform multiple iterations of encryption one a single length of data. Also, multiple subsets of the third set of bits could be utilized to identify multiple random relative addresses. The multiple subsets of the third set of bits could be utilized to determine multiple random relative addresses, which will mark the beginning of the next encryption iteration.

FIG. 7 is a flowchart 400 representing an embodiment of a setup phase for the present invention. The setup phase is used to create a unique encryption schema and to store this schema not only at the data site, but also within the security unit that is then attached to a user's computer. Once the setup phase is complete, then the user may transfer encrypted information and decrypt it. In step 452 the data site identifies multiple encryption algorithms that will be used to encrypt portions of information within a particular message to be sent to a user. It is contemplated that a unique set of multiple encryption algorithms will be associated with a particular security unit, and thus a particular user, although it is possible that the same encryption algorithms could be used for any number of security units. In step 454 a unique encryption schema is produced for the particular security unit. As in step 452, it is contemplated that there will be a unique encryption schema for each security unit, although it is possible that one encryption schema may be used for any number of security units. This encryption schema is a random series of bits, bytes, and/or words that is preferably stored in a memory device of a computer at the data site.

Once an encryption schema has been identified for a particular security unit, the data site in step 456 then agrees upon a convention to use for the sets of bits that will be accessed within the encryption schema. The data site identifies the number of bits to be used to represent the "length of string", the "encryption algorithm identifier", and the "relative address". The data site also identifies the relative location of these three sets of bits in relation to an entry point indicated by the address register. As an illustrative example, FIG. 6 shows that in one embodiment each of the three sets of bits is 8 bits in length and they begin at the location indicated by the address register and follow consecutively thereon. Of course, other conventions are possible.

For large amounts of data to be transmitted, it may be desirable to agree upon a convention whereby a block of data to be transmitted is kept to a reasonable size so that each block of data may be decrypted rapidly on the user's computer, and the user may view the information in chunks as it is decrypted. By way of example, data may be broken up into no more than 4K byte chunks. Each block is encrypted by the data site and decrypted by the user computer according to the present invention; i.e., random algorithms and random length strings are used within each block. In this way, a user is allowed to view a block of information rapidly, without having to wait for a large amount of data to be decrypted.

In step 458 the data site associates each of the multiple encryption algorithms with a unique encryption algorithm identifier. For example, if there are four encryption algorithms and the encryption algorithm identifier is two bits in length, then each encryption algorithm is assigned a unique number from 0 to 3. Of course, a wide variety of encryption algorithm identifiers and techniques for associating an identifier with an algorithm may be used.

Once an encryption schema has been produced at the data site, then in step 460 this encryption schema is stored in a memory at the data site and is also stored in the memory of its corresponding security unit. The data site also associates a user identifier, and/or a password and a personal identification number (PIN) with the security unit at step 462. The user identifier is a human readable identifier such as the user's name that is for convenience in identifying a particular user with a security unit. The password associated with a security unit is used to identify a particular security unit and its corresponding encryption schema The PIN associated with a particular security unit and encryption schema is used to uniquely access an entry point in the encryption schema by combining the PIN with a public code. In step 464 the user acquires the security unit along with the associated user identifier, password and PIN. In step 466 the user connects the security unit to the user's computer and is now ready to transfer encrypted information and to decrypt it.

Figure 8B:
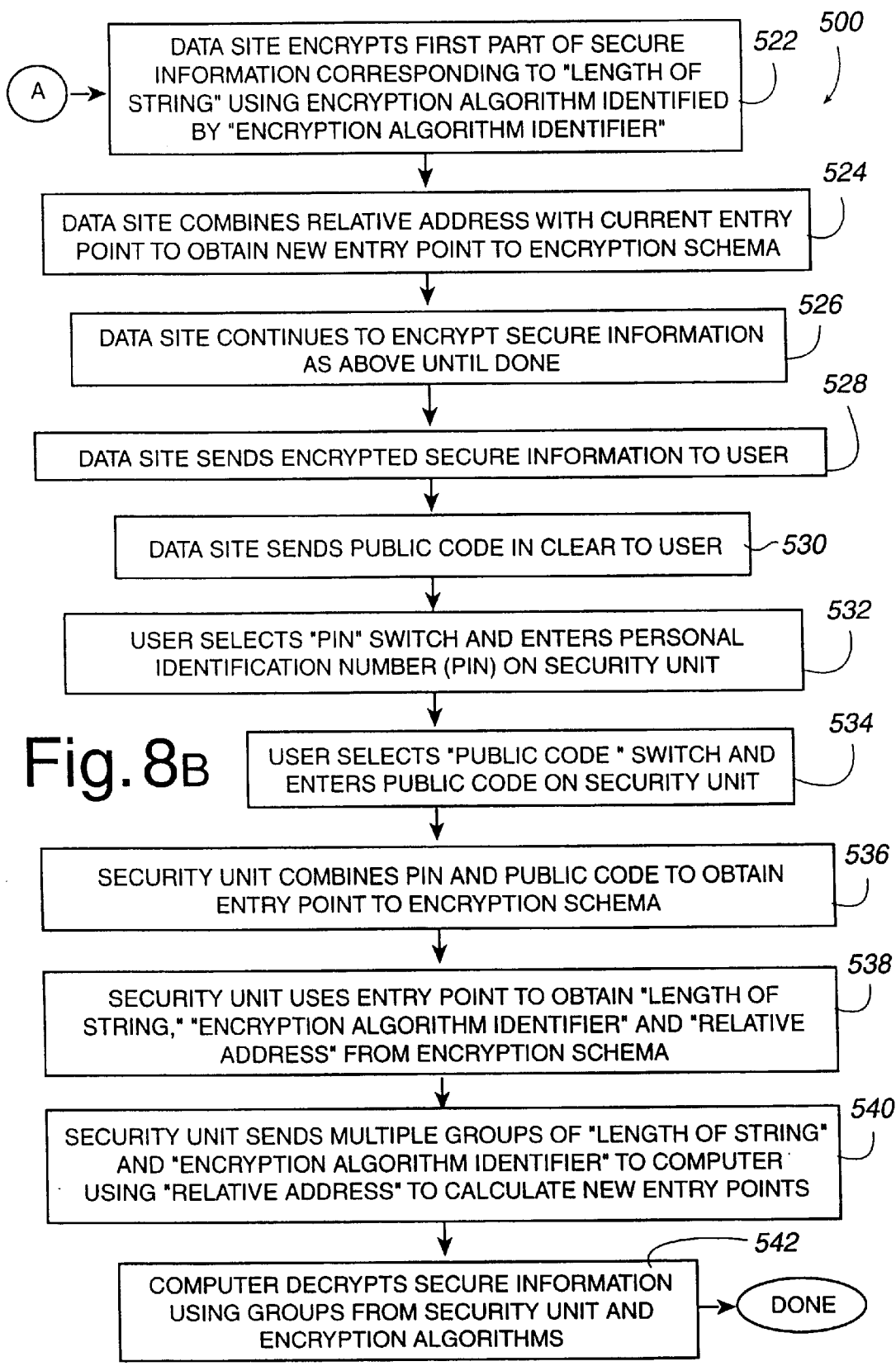

FIGS. 8A and 8B are a flowchart 500 illustrating a technique by which a user may transfer encrypted information and then decrypt it in a secure fashion using an embodiment of the present invention. In step 502 the user establishes communication between his computer and a data site. If the data site is located on a server computer that is part of the Internet, then communication may be established using a web browser and a URL address. If the data site is part of a LAN or WAN then communication may be established in any standard fashion. Step 504 determines whether the user desires to view public or secure information. If the user desires to view public information then in step 506 the user may transfer this information and view it without the need for the information to be encrypted. However, if the user desires to view secure information that must be transferred in an encrypted form, then the following steps take place.

In step 508 the user supplies his password to the data site. This password is transmitted in the clear and is used to tell the data site who is communicating with it and which encryption schema to use to encrypt information to be sent. Step 510 determines whether a modified driver may be needed by a user's computer. For example, if the user connects the security unit between the mouse and mouse port of his computer, it may be necessary to use a slightly modified mouse driver software for receiving information from the security unit. If such a modified driver is needed, then in step 512 this modified driver is downloaded from the data site to the user's computer and is installed as the current driver. In step 514 the data site identifies the appropriate encryption schema and user PIN that corresponds to the password that the user has supplied. In this fashion, the data site has identified an encryption schema and a user PIN that will also be used by the user in his security unit. This insures that information encrypted using the encryption schema and user PIN will be able to be decrypted by the user on any computer.

In step 516 the data site calculates a public code. This public code may be any sequence of numbers, letters, and/or symbols that is used to access the encryption schema. Both the data site and the security unit at the user's computer will combine the same user PIN and public code in order to access the same encryption schema. In step 518 the data site combines this public code with the user PIN to obtain an entry point into the encryption schema. This entry point represents a random address into the encryption schema and serves as a starting point for determining the first length of string, encryption algorithm identifier and relative address. Thus, in step 520 the data site uses this entry point to obtain three sets and subsets of bits that correspond to the first length or lengths of the string to be transmitted, an encryption algorithm identifier or identifiers and a relative address or addresses. One method of obtaining the three sets of bits is where the combined public code and user PIN are then processed through an exclusive OR (XOR) with the first three sets of bits which begin at the entry point. This encrypts of the three sets and subsets. The result is then utilized to identify the corresponding lengths, algorithms and relative addresses.

In step 522 the data site encrypts a first part of the information to be sent to the user using the encryption algorithm identified by the encryption algorithm identifier bit set. If multiple subsets of encryption algorithm identifier bit set are available then multiple encryption algorithms can be applied, in a predetermined order to the information to be encrypted. The length of the part of the information to be encrypted is determined by the "length of string" number determined from the encryption schema in step 520. Now that a first part of the information has been encrypted, the data site continues to randomly access the encryption schema to determine the next part of the information to encrypt and to determine which encryption algorithm to use to encrypt it.

Thus, in step 524 the data site combines the relative address obtained in step 520 with the address of the current entry point to obtain a new entry point into the encryption schema. Because the original entry point and the relative address are both random numbers, and because they may be combined in any random fashion, the new entry point into the encryption schema will also be a random entry point. In step 526 the data site continues to encrypt all of the information to be sent to the user as described in step 522. For example, the new entry point into the encryption schema identifies three new sets of bits that correspond to the next "length of string", the "encryption algorithm identifier", and the next "relative address". Using these three new sets of numbers, the next part of the information to be transmitted is encrypted using the appropriate algorithm and a new entry point is calculated using the most recently obtained relative address. This process of calculating new entry points into the encryption schema and determining new encryption algorithms for portions of the information continues until all of information is encrypted. In step 528, the data site sends this encrypted information to the user. It should be appreciated that once the information has been encrypted it may be sent to the user at any time. For example, the information may be sent to the user as soon as all of it has been encrypted, it may be sent at a later time after the public code has been sent to the user, or each part of the information may be sent continuously to the user as it is encrypted by the data site. In step 530 the data site sends the public code it has calculated to the user in the clear. Of course, the public code may also be transmitted at any time.

Now that the encrypted information has been transmitted to the user's computer and the user has received the public code, the user is ready to decrypt the information on his computer. In step 532, the user selects the "PIN" setting of the PIN/public code switch on the number input device of the security unit and enters the PIN on the security unit. In this step, the PIN is thus transferred into the PIN register 304 of the security unit 52. In step 534 the user selects the "public code" setting of the PIN/public code switch and enters the public code on the number input device of the security unit. Thus, this step transfers the public code into public code register 306 of the security unit.

Next, in step 536 the security unit combines the PIN and the public code to obtain an entry point into the encryption schema. In one embodiment of the invention, this combination is performed by merging logic 308 of the security unit and the entry point is stored in address register 312. Because the data site has previously combined the same public code and the same PIN using the same combination technique, the entry point obtained by the security unit into the encryption schema will be the same entry point obtained by the data site previously in step 518. Thus, both the data site and the security unit are synchronized with respect to where to begin within the encryption schema for encryption/decryption. Because the encryption schemas are the same for each, similar sets of bits are obtained from the encryption schemas.

In step 538 the security unit uses this first entry point to obtain three sets of information corresponding to first "length of string, "encryption algorithm identifier", and "relative address" from the encryption schema. Because both the security unit and the data site are following the same convention for the length of each of these sets of information and where they are located in relation to the entry point, the security unit will obtain the same values as the data site for these three sets. One method of obtaining the three sets of bits is where the combined public code and user PIN are then processed through an exclusive OR (XOR) with the first three sets of bits which begin at the entry point. This encrypts of the three sets and subsets. The result is then utilized to identify the corresponding lengths, algorithms and relative addresses. Using the value for "relative address", the security unit uses increment logic 310 to combine the relative address with the current address to place a new entry point into address register 312. This new entry point will be the same new entry point as calculated in step 524 for the data site because the addresses are both the same and because increment logic 310 used by the security unit uses the same logic as the data site in step 524 to combine the two addresses. In this fashion, the security unit continues to calculate new entry points and obtain groups of values for the quantities "length of string", "encryption algorithm identifier", and "relative address" until a predetermined number (previously agreed upon with the data site) of these groups of values are obtained.

In step 540 the security unit sends these multiple pairs of the quantities "length of string" and "encryption algorithm identifier" to the user computer. (The quantity "relative address" need not be sent to the computer.) Any quantity of these pairs of values may be sent to the computer. The computer will decrypt data sent from the data site until these values are all used up. For example, if the security unit transfers 100 pairs to the computer, the computer will decrypt the data sent using the 100 identified algorithms and the 100 length of strings. If all the data has been decrypted using less than the 100 groups, then no more need be sent. If, however, more encrypted data remains after the 100 pairs have been used up, then the user will be prompted to perform a reset to obtain more pairs from the unit. Alternatively, the data site may prompt for a reset, or it may occur automatically.

If the security unit has been placed between the computer mouse and the mouse port, then data may be sent from the security unit to the computer by simulating a mouse click or a series of mouse clicks. For example, the unit may simulate a mouse click for each pair of values to be transmitted to the computer, or a number of clicks may be simulated for each pair to be sent. As described above, a modified mouse driver may be used to recognize these pairs of values rather than the regular mouse signals. In one embodiment of the invention, the data is sent from the unit upon activation of the "load" switch as described above in FIG. 5.

Once the computer has received the length of string quantities indicating how much of the encrypted message to decrypt with each decryption algorithm, and has received the various encryption algorithm identifiers indicating which encryption algorithm to use, the computer may then in step 542 decrypt the encrypted information and produce information readable by the user. It should be appreciated that the "length of string" and "encryption algorithm identifier" quantities may be transmitted from the security unit to the computer in a variety of fashions. By way of example, in the above-described steps, this information is sent as a whole to the computer. In another embodiment, as each quantity is identified with the encryption schema it may be sent on to the computer.

In one embodiment of the invention, the mouse button may also be used to select a new entry point into the encryption schema and to initiate the sending of the "length of string" and "encryption algorithm identifier" on to the computer in much the same way that the "load" switch operates.

In an alternative embodiment, by comparing the "length of string" quantities received from the security unit with the length of the encrypted message received from the data site, the computer may indicate to the user when it has received all of the appropriate quantities of information and/or when it needs more quantities.

Once the original secure information requested by the user has been decrypted in step 542, the user may wish to view more secure information, in which case the multiple pairs loaded from the unit in step 540 are continued to be used until used up. If these pairs are all used up, or become used up in the course of decrypting the additional secure information, then new pairs may be obtained from the unit as described above in step 540. If the user wishes to view public information in the clear, then that information may be requested from the data site to be downloaded unencrypted. If secure data is then requested after viewing public data, then the equivalent of a reset occurs and control returns to step 516.

A reset may also occur anywhere in the process in order to synchronize the data site and the security unit or to ensure a higher level of security. For example, if the user has difficulty reading the decrypted information, or is unable to decrypt the information, then the user may send a reset command to the data site requesting that a synchronization occur. In this instance, the data site will calculate a new public code, combine the new public code with the user PIN, choose a new entry point into the encryption schema, and encrypt the information to be sent all over again using the above techniques. This new public code and newly encrypted information is then transmitted to the user again and the user may again attempt to decrypt the received information by entering the new public code and the user PIN on his security unit.

Also, at any time during the transmission of information, the data site may request a reset itself The data site would then calculate a new public code, etc., and send to the user the new public code and newly encrypted information. The user must then enter the new public code and his user PIN again in order to decrypt subsequent information being sent from the data site. This forced reset by the data site may be used to ensure that an authorized user is still present at the computer and/or to ensure that the user PIN has been entered correctly. A forced reset may also be used by the data site in order to further heighten security of the transmitted information to the user's computer.

A reset may also be accomplished automatically. For example, a known sequence of bits is embedded in the message and is looked for by the user computer. If the sequence is detected in the correct place, then both are synchronized and no reset need occur. However, if not detected, then the user computer reprocesses the last algorithm until the sequence is detected. If still unsuccessful, then a manual reset is forced. This technique works well with high-volume high-speed data.

COMPUTER SYSTEM EMBODIMENT

Figure 9:
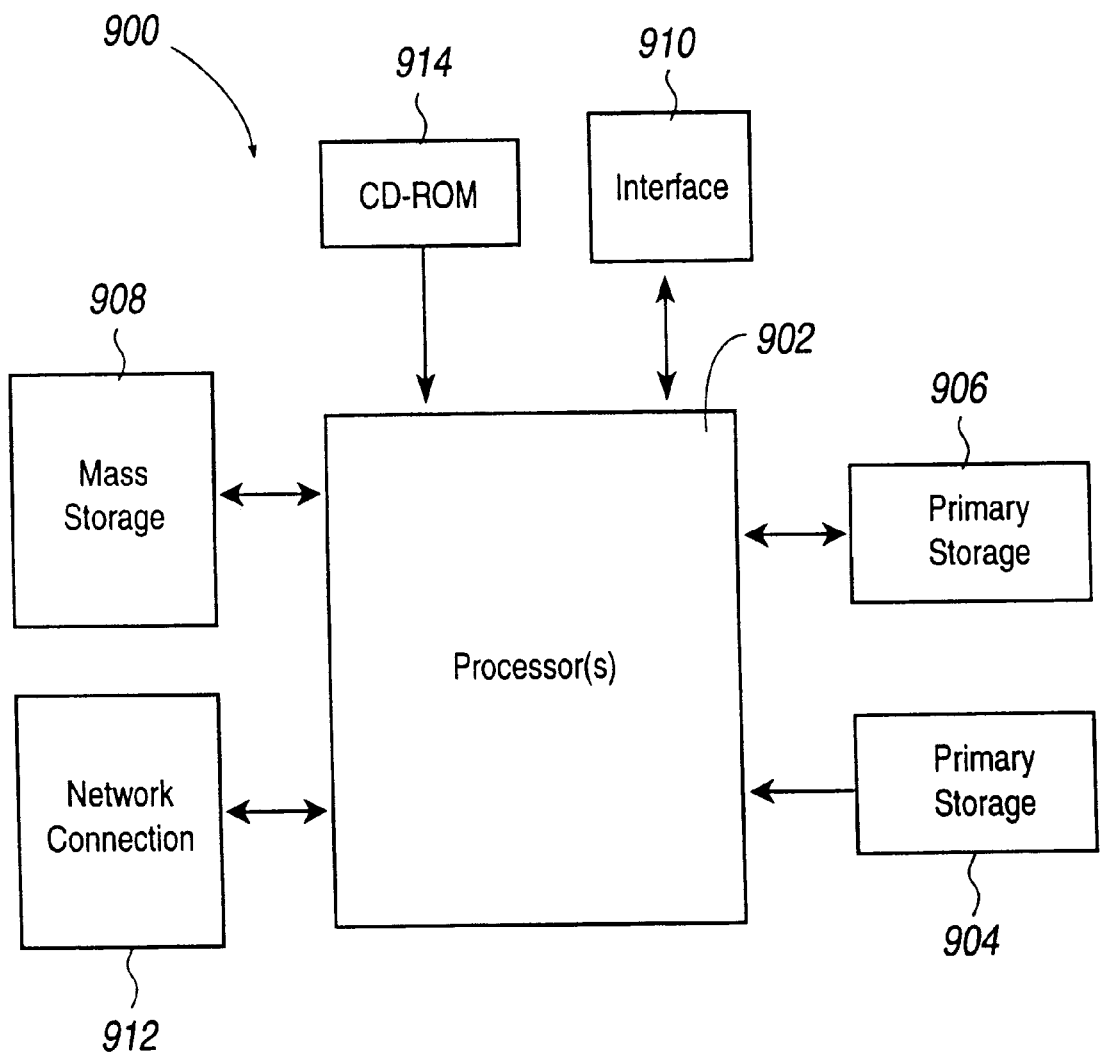
FIG. 9 is a block diagram of a typical computer system suitable for use with an embodiment of the present invention.

FIG. 9 illustrates a computer system 900 that may be used with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions unidirectionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data unidirectionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Figure 10:
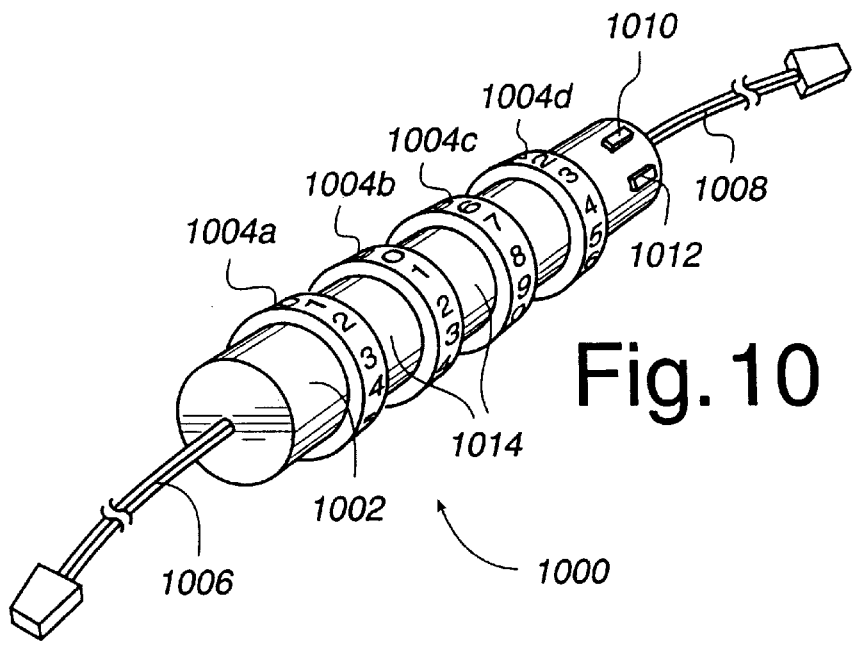
FIG. 10 is a perspective view of an alternate embodiment for a security unit.

An alternate embodiment for a security unit 1000 is illustrated in FIG. 10. The security unit 1000 includes a cylindrical body 1002 including a number of thumb-wheels 1004a–1004d, a pair of cables 1006 and 1008, and a pair of buttons 1010 and 1012.

The thumb-wheels 1004a–1004d include, in this example, the number 0, 1, 2, . . . , 9. Other indicia (such as letters), or fewer or more indicia can also be used. The thumb-wheels are caused to rotate around an axis of cylindrical unit 1002, until selected numbers align with a mark 1014. The thumb-wheels control switches capable of inputting the numbers specified by the thumb-wheels into the security unit 1000. In this fashion, for example, a personal identification number (PIN) or a public code can be input into the security unit 1000. In this example, a user has rotated the various thumb-wheels 1004a–1004d to enter the numbers "3184" into the security unit 1000. Of course, other mechanisms for entering numbers, such as a rotary "combination-lock" type mechanism, could also be used for entering the numbers to the security unit 1000.

The button 1012 is preferably an output or "load" control button which is used to indicate from where the signal to the computer is coming, as described previously. In one position, the button 1012 indicates that the signal to the computer is coming from the mouse, and in another position the button 1012 indicates that the signal to the computer is coming from an internal processor of the security unit 1000. That is, button 1012 can, in effect, inactivate the security unit 1000 such that the signals from the mouse pass through the security unit, or it can activate the security unit 1000 so that the security process of the present invention can be implemented.

The button 1010 is preferably a PIN/public reset button. That is, the button 1010 indicates what the numbers on the thumb-wheels represents. In button one position, the numbers on the thumb-wheels represent a private code (i.e. a PIN), and in another button position the button 1010 indicates that the numbers on the thumb-wheels represent a public code provided by some public source.

The cables 1006 are used to connect the security unit to a computer and to a peripheral device. For example, cable 1006 can be coupled to a mouse input port of a computer, while cable 1008 can be coupled to a mouse. Of course, other types of coupling arrangements can be used. For example, cable 1008 can be replaced by a mouse input port on the security unit 1000 such that the cable from the mouse can be plugged directly into the security unit 1000. Other types of connector and cable arrangements are well known to those skilled in the art.

Figure 11:
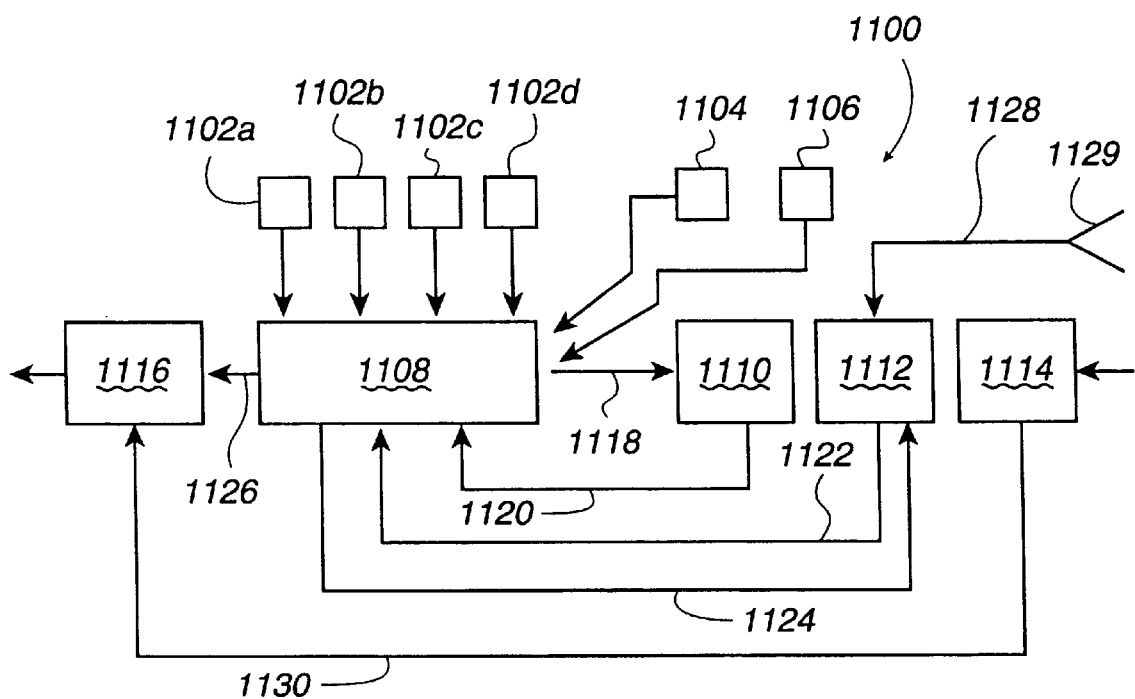
FIG. 11 is a block diagram of electrical components of the security unit of FIG. 10.

The electronic circuitry 1100 for one embodiment of the security unit 1000 is illustrated in FIG. 11. The circuitry 1100 includes a number of switches 1102a–1102d which correspond to thumb wheels 1004a–1004d, respectively. It also includes switches 1104 and 1106 which correspond to buttons 1012 and 1010, respectively.

The circuitry further includes a microcontroller or microprocessor 1108, ROM memory 1110, writeable memory 1112, an input buffer 1114, and an output buffer 1116. The switches 1102a–1102d, 1104, and 1106 are all coupled to inputs of the microprocessor 1108. The microprocessor 1108 is also coupled to ROM 1110 by busses 1118 and 1120, to writeable memory by busses 1122 and 1124, and to output buffer 1116 by bus 1126. The writeable memory 1112 is coupled by a bus 1128 to a port 1129, and the input buffer 1114 is coupled to the output buffer 1116 by a bus 1130.

An advantage of the embodiment of circuitry 1100 is that, in addition to the ROM 1110, a writeable memory 1112 is provided. That is, the encryption schema in ROM 1110 is fixed, while the encryption schema in memory 1112 can be changed. The writing to the memory 1112 can be via port 1129 which can be, for example, connected to a serial port of the computer. That is, a new encryption schema can be downloaded to the computer, and then downloaded into the memory 1112 from via port 1129. The memory 1112 is preferably a writeable, but non-volatile, memory such as Flash memory, EEPROM memory, etc.

The memory 1112 can be further segmented into multiple encryption schemas. However, the memory will be described as including only a single schema for ease of description, it being understood that the memory is fully capable of supporting multiple downloaded schema.

The ROM memory 1110 is personal to a user and corresponds to that user's PIN number. It functions as described previously. The writeable memory 1112 can hold a "public" schema, e.g. one assigned by a particular company. This, for example, allows a company to provide secure data for its employees without having to store a separate encryption schema for each employee. This, as another example, could also be used by Internet content providers to allow a public password to be made available for its paying customers. The public encryption schema is preferably changed from time to time to ensure that only current employees or paying customers have access to the information. Since two encryption or more encryption schemas can be provided by this system, a user can always be assured of accessing his or her personal data (encrypted with his or her personal encryption schema), but can also access other data as desired and permitted.

It should be noted that since the public encryption schema can be accessed by a number of different users, each of which will have their own PIN, the system must provide a "public code" that corresponds to that PIN. That is, if a certain memory address in the public encryption schema is to be accessed with different PINs, it is clear that a public code that corresponds to that PIN must be provided to provide the correct starting address within the schema.

Although the foregoing invention has been described in some detail for purposes of clarity of understanding, it will be apparent that certain changes and modifications may be practiced within the scope of the appended claims. For instance, the security unit may attach to a user's computer in many ways or even be present inside of the computer. Furthermore, the unit may connect to any port of the computer, or use any other suitable method for transmitting its contained encryption information to the computer. Alternatively, the unit could be implemented in software on the user's computer and utilize the computer's CPU rather than being a separate unit. Both a user PIN and public code may be used for accessing the encryption schema, or only one may be used or a multitude of other codes and/or numbers may be used. The logic within the unit can be implemented using any suitable digital or analog hardware, or may also be implemented in software. The sets of data stored in the schema may be ordered in any fashion or be of any length, and may refer to any units of data that may be stored. The user's computer may decrypt the received information as information is received from the unit, or it may wait until all of the information is received. Also, the unit may be used to provide for secure data communications between a hard disk of a computer and RAM in order to provide a safeguard for confidential data on a computer, such as on a hard disk of a laptop computer.

Figure 12:
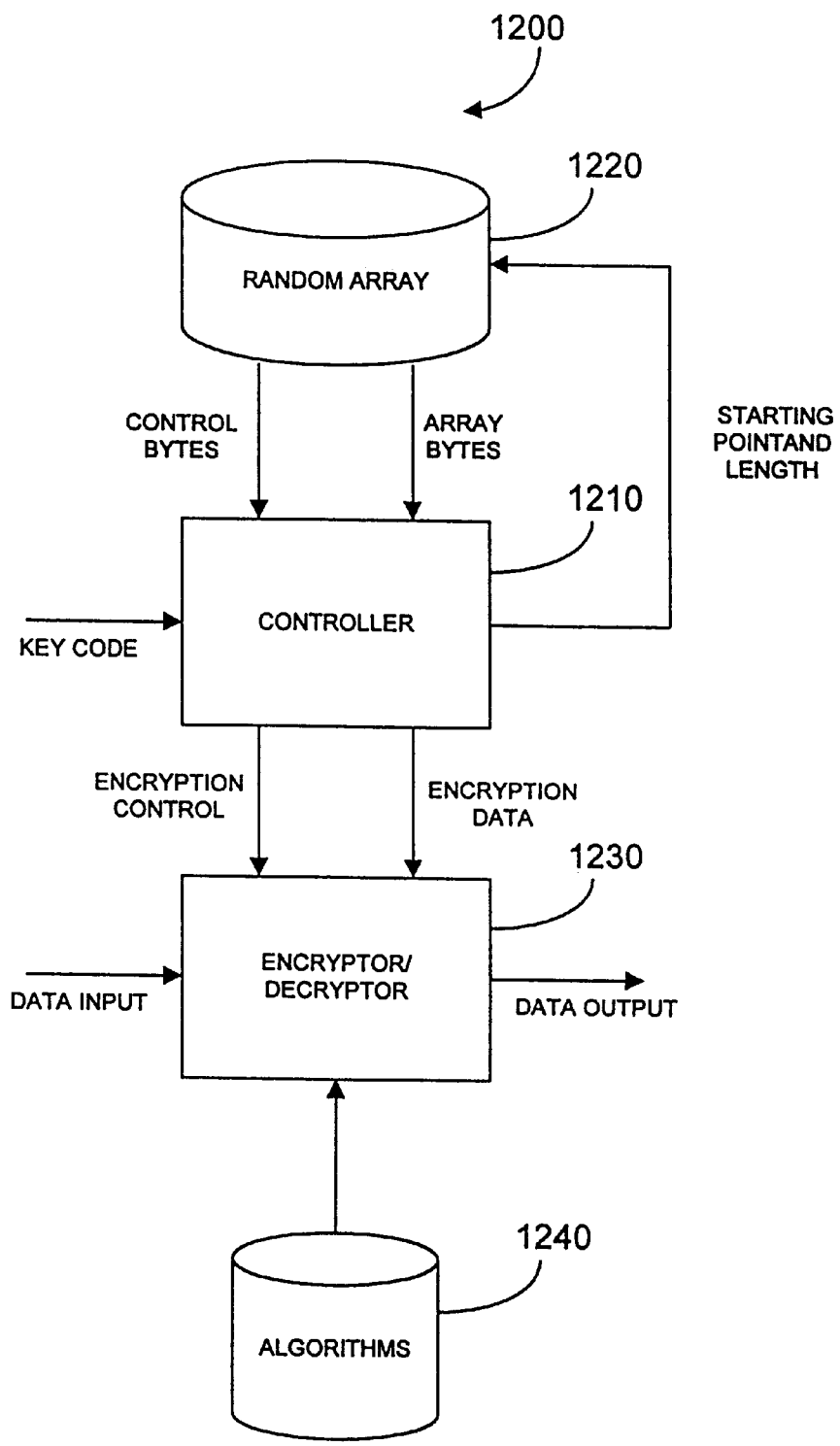
FIG. 12 is a block diagram of an encryption/decryption system in accordance with the present invention.

FIG. 12 illustrates one embodiment 1200 of the present invention. This embodiment 1200 includes a controller 1210 for controlling the encryption/decryption operation and operable to read an electronically readable media containing an array of random data 1220. An encryptor/decryptor 1230 is also included and provides the encryption or decryption processing. A plurality of encryption/decryption algorithms 1240 is also provided in a form capable of being accessed by or stored within the encryptorldecryptor 1230. Each of the plurality of encryption/decryption algorithms 1240 includes at least one, unique encryption/decryption algorithm identifier. Each encryption/decryption algorithm identifier is preferably a number.

The controller 1210 and the encryptor/decryptor 1230 can also be integrated into one processor. The controller 1210 and the encryptor/decryptor 1230 can be a general purpose computer, a specialized computer processor, a workstation, a desktop computer, a laptop computer, a portable computer, a cable television decoder box, a Web TV set top box, a personal digital assistant (PDA) (such as those made by Apple Computer, Inc., U.S. Robotics, Inc., etc.), a cellular telephone, a digital handset using personal communication services (PCS) or other wireless device, or any other computing device which has a need for receiving or transmitting secure information. The electronically readable media can also be integrated within controller 1210 and/or the encryptor/decryptor 1230.

The controller 1210 can also include an input device. The input device may be any suitable type of input device used for entering numbers, letters, and/or symbols into the controller 1210. In one embodiment of the invention, simple number wheels are used to enter a sequence of numbers. The use of a rotary number wheel or thumb wheels are for illustration only; any other method of selecting data may also be used such as buttons, a dial, switches, electronic input, keyboards, voice recognition, scanners, a mouse or other pointing device, etc.

The electronically readable media can be any mass storage media or combinations of mass storage media such as a random access memory, read only memory, magnetic media, optical media, magneto-optical media, CDROM, digital video disk (DVD), hard disk, a magnetic strip-type card, a remote computer memory storage location accessible via and electronic network such as a telephone system or a computer network, or any other electronically readable media method. In an alternative embodiment, a memory system can be used. The memory system includes a combination of one or more types of electronic media.

The connections to and from the system 1200 components can be an electronic network via cable, microwave, wireless, LASER, infra red (IR), digital, networked via a local area network (LAN) protocol, wide area network (WAN) protocol, Internet (IP) protocol, Ethernet or any other method of providing the signals for the connections to and from the system 1200 components. In one embodiment, the electronically readable media can include storage of both the plurality of encryption/decryption algorithms 1240 and the array of random data 1220.

Figure 13:
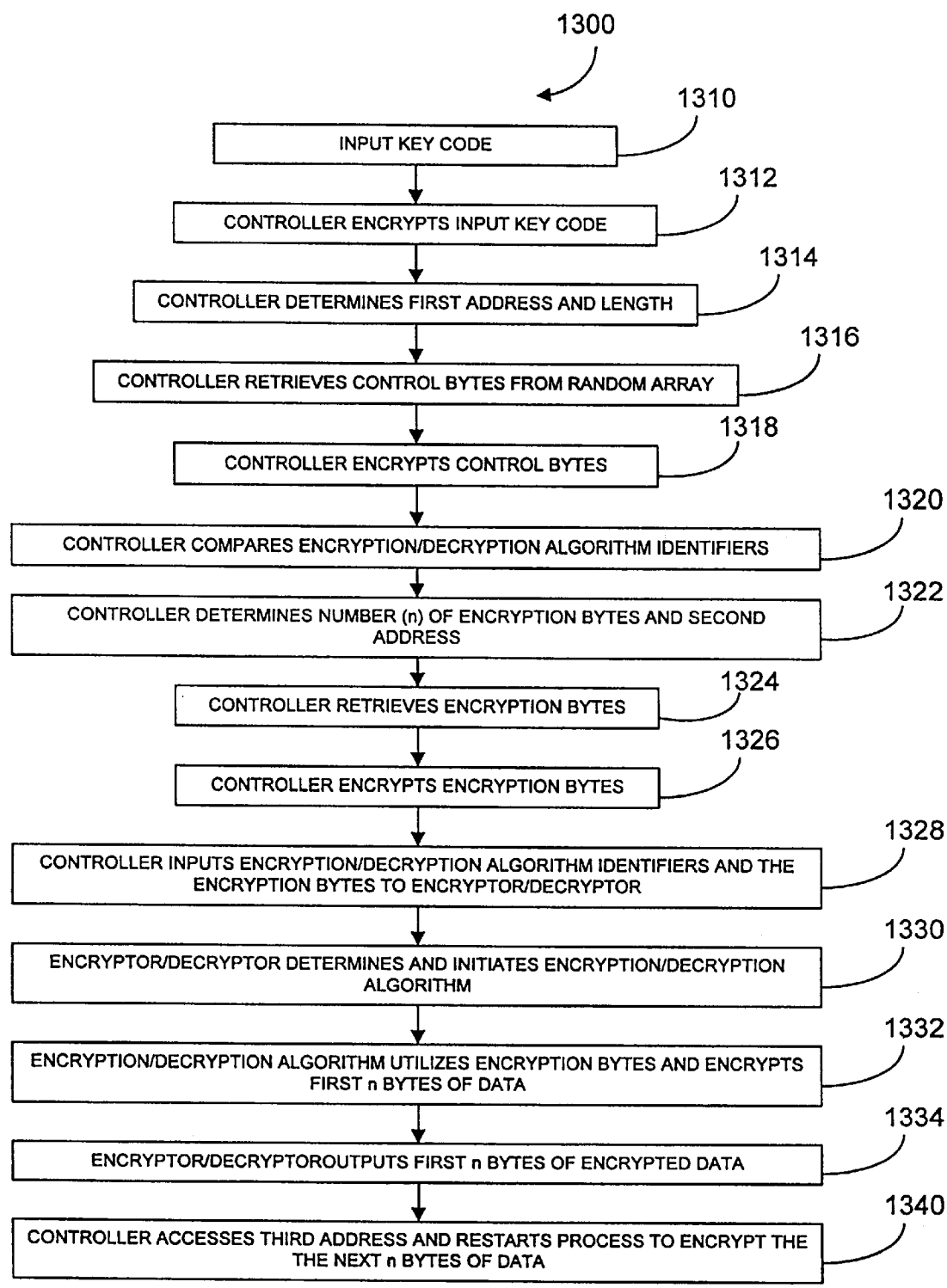
FIG. 13 is a flowchart of the embodiment illustrated in FIG. 12.

FIG. 13 illustrates a flowchart 1300 of the embodiment 1200 operation. First, a key code is input to the controller 1210. The controller 1210 processes the key code and determines a first starting point and a length of control data. The first starting point is a first computed address within the array of random data 1220. The length of control data is defined as how many bytes of control data to retrieve from the array of random data 1220. The controller 1210 then accesses the array of random data 1220 at the first computed address determined by the key code, and retrieves the number of control bytes, from the array of random data 1220.

One skilled in the art will appreciate that the key code can include a plurality of key components or sub keys or codes such as a private code, a personal identification number (PIN) or a public code or combinations and multiples thereof Such sub codes may be numeric, alphabetical, alphanumeric, biometric, or graphical or any other form capable of being converted to a data form suitable for input to the controller.

In one embodiment, the key code is converted to a numeric value. If the resulting key code numeric value is equivalent to an address within the array of random data 1220 then that address is utilized. If the numeric value is not equivalent to an address within the array of random data 1220 then the numeric value is divided by 2 until the result is equal to an address within the array of random data 1220. The number of control data bytes in this embodiment is set in the controller at constant five. In an alternative embodiment, the number of control bytes may be a variable quantity or a function of the control bytes or a function of the key code or some constant value other than five.

One skilled in the art will appreciate the control bytes may be bytes located at a first computed address or addresses identified by the controller 1210. In the described embodiment, the control bytes immediately follow the starting point. The controller may determine the first computed address or addresses via utilizing the key code, an internal method or any combinations thereof. Alternatively, the control bytes can be distributed across several different addresses within the array of random data 1220. The control bytes may also be retrieved from the array of random data 1220 in any order and not limited to only the order described.

In the present embodiment, the numeric value of the key code is 1,958,382 and the array of random data 1220 has address locations 0–1,048,575 (1 Mb) then the key code must be divided by 2 which would result in an address value of 979,191. The controller would then access the array of random data 1220 at address location 979,191 and retrieve five control bytes, i.e. bytes 979,191 through 979,195. In the present example the control bytes have the values and functions as follows:

| Byte address | Value | Function |
|---|---|---|
| 979,191 | 10000001 | Number of bytes to process |
| 979,192 | 01110111 | First encryption/decryption algorithm identifier |
| 979,193 | 11110010 | Second encryption/decryption algorithm identifier |
| 979,194 | 00111000 | Third encryption/decryption algorithm identifier |
| 979,195 | 10000101 | Third address value |

The controller 1210 then compares the first, second and third encryption/decryption algorithm identifiers to make sure none of the encryption/decryption algorithm identifiers identify the same encryption/decryption algorithm and associated parameters.

In the present embodiment, byte 979,191 identifies the number of encryption bytes to process and has a value of 129. The controller 1210 then accesses the array of random data 1220 and retrieves 129 encryption bytes of data starting at a second starting point also known as a second address. The controller can determine the second address or addresses via utilizing the key code, the control data, an internal method or any combinations thereof. The second starting point can be determined by any formula such as, the first byte following the control bytes, or a certain number of bytes after the control bytes, or a function of the control bytes, or any other formula that results in an address within the array of random data 1220. The encryption bytes can be retrieved in a sequential order or, alternatively, the encryption bytes can be distributed across a plurality of second addresses within the array of random data 1220. The encryption bytes may also be retrieved from the array of random data 1220 in any order.

In an embodiment where the second address is determined as the first byte following the control bytes and where the encryption bytes are sequential, the controller 1210 then retrieves 129 bytes of data starting at byte 979,196. The controller then inputs the 129 bytes from the array of random data 1220, and the first, second and third encryption/decryption algorithm identifiers to the encryptor/decryptor 1230.

The encryptor/decryptor 1230 then accesses the first encryption/decryption algorithm identifier and initiates the corresponding first encryption/decryption algorithm. The encryptor/decryptor 1230 then accesses the first 129 bytes of unencrypted data from the data input terminal. The first encryption/decryption algorithm then utilizes the 129 encryption bytes and encrypts the first 129 bytes of data from the data input terminal. The resulting 129 bytes of first layer encrypted data is then stored within the encryptor/decryptor 1230.

The encryptor/decryptor 1230 then accesses the second encryption/decryption algorithm identifier and initiates the corresponding second encryption/decryption algorithm. The encryptor/decryptor 1230 then accesses the 129 bytes of first encrypted data. The second encryption/decryption algorithm then utilizes the 129 encryption bytes and encrypts the 129 bytes of first encrypted data which was encrypted by the first encryption algorithm above. The resulting 129 bytes of second layer encrypted data is then stored within the encryptor/decryptor 1230.

The encryptor/decryptor 1230 then accesses the third encryption/decryption algorithm identifier and initiates the corresponding third encryption/decryption algorithm. The encryptor/decryptor 1230 then accesses the 129 bytes of second encrypted data which was encrypted by the second encryption algorithm above. The third encryption/decryption algorithm then utilizes the 129 encryption bytes and encrypts the 129 bytes of second encrypted data. The resulting 129 bytes of third layer encrypted data is then output from the encryptor/decryptor 1230 through the data output terminal. The third layer encrypted data is also referred to as a multilayed encrypted data stream since it is encrypted more than once.

The controller then accesses the fifth control byte, byte 979,195 in this example, to determine the third address. The third address is then utilized as the first starting point of the next encryption cycle for the next quantity of data. The process then repeats to encrypt the next quantity of sequential data from the input terminal. The process continues to repeat until the desired unencrypted data at the input terminal is encrypted.

In an alternative embodiment, the controller 1210 can also encrypt the control bytes as accessed from the array of random data 1220. One method of encrypting the control bytes is to combine the key code and the control bytes. Other methods of encryption may also be utilized. The resulting encrypted control bytes could be utilized as described above or could be encrypted by yet another method or iteration and then utilized. In another alternative embodiment, the encryption bytes can themselves be encrypted before use through similar methods as described for the control bytes above.

As will be appreciated to those skilled in the art, the above described encryption processes could be repeated an infinite number of iterations. Three iterations of the data encryption process and one iteration of the control byte encryption are described above for illustration purposes only and not intended to limit the present invention to only the described number of iterations. As will be appreciated to one skilled in the art, the encryption/decryption algorithms can include any method of encryption/decryption such as: salting, and bit/byte manipulation, bit/byte substitution, exchanging bits/bytes, ORing bits, exclusive Oring, ANDing bits, character transformation, character movement or combinations of these or any other more complex encryption schemes for encrypting information not requiring transmission of a key together with the encrypted information.

One embodiment of the decryption process is substantially the reverse of the encryption process described above. As will be appreciated by those skilled in the art, the decryption requires the same conditions and inputs that were utilized to encrypt the data to successfully decrypt the data. The conditions and inputs include the utilizing the same array of random data; utilizing the same key code, utilizing the same encryption/decryption algorithms and having the same encryption/decryption algorithm identifiers; configuring the other alternatively described embodiments as the same.

First, the key code, which was utilized to encrypt the data, is input to the controller 1210. The controller 1210 processes the key code and determines the first starting point and the length of the control data. The first starting point is the first computed address within the array of random data 1220. The length is defined as how many bytes of control data to retrieve from the array of random data 1220. The controller 1210 then accesses the array of random data 1220 at the first computed address determined by the key code, and retrieves the number of control bytes, from the array of random data 1220.

In the present example, the numeric value of the key code is 1,958,382 and the array of random data 1220 had address locations of 0–1,048,575 (1 Mb) then the key code must be divided by 2 which would result in an address value of 979,191. The controller would then access the array of random data 1220 at address location 979,191 and retrieve five control bytes, i.e. bytes 979,191 through 979,195 as described above.

The controller 1210 then compares the first, second and third encryption/decryption algorithm identifiers to make sure none of the encryption/decryption algorithm identifiers identify the same encryption/decryption algorithm and parameters. In this embodiment, byte 979,191 identifies the number of bytes to process and has a value of 129. The controller 1210 then accesses the array of random data 1220 and retrieves 129 bytes of data starting at the second starting point also known as the second address. The controller may determine the second address or addresses via utilizing the key code, the control data, an internal method or any combinations thereof. Since the encryption cycle determined the second address as the first byte following the control data, the decryption process must follow the same method, therefore, the controller 1210 then retrieves 129 encryption bytes of data starting at byte 979,196. The controller would then input the 129 encryption bytes from the array of random data 1220, and the first, second and third encryption/decryption algorithm identifiers to the encryptorldecryptor 1230.

The encryptor/decryptor 1230 then accesses the third encryption/decryption algorithm identifier and initiates the corresponding third encryption/decryption algorithm. The encryptor/decryptor 1230 then accesses the first 129 bytes of third layer encrypted data from the data input terminal. The third encryption/decryption algorithm then utilizes the 129 encryption bytes and decrypts the 129 bytes of third layer encrypted data. The resulting 129 bytes of second layer encrypted data is then stored within the encryptor/decryptor 1230.

The encryptor/decryptor 1230 then accesses the second encryption/decryption algorithm identifier and initiates the corresponding second encryption/decryption algorithm. The encryptor/decryptor 1230 then accesses the 129 bytes of second layer encrypted data. The second encryption/decryption algorithm then utilizes the 129 encryption and decrypts the 129 bytes of second layer encrypted data. The resulting 129 bytes of first layer encrypted data is then stored within the encryptor/decryptor 1230.

The encryptor/decryptor 1230 then accesses the first encryption/decryption algorithm identifier and initiates the corresponding first encryption/decryption algorithm. The encryptor/decryptor 1230 then accesses the 129 bytes of first layer encrypted data. The first encryption/decryption algorithm then utilizes the 129 encryption bytes and decrypts the 129 bytes of first layer encrypted data. The resulting 129 bytes of decrypted data is then output from the encryptor/decryptor 1230 through the data output terminal.

The controller then accesses the fifthcontrol byte, byte 979,195 in this embodiment, to determine the third address. The third address is then utilized as the first starting point of the next decryption cycle for the next quantity of data. The process then repeats to decrypt the next quantity of data.

In another alternative embodiment, the array of random data 1220 is first processed to determine a reduced array. In one embodiment, the reduced array is determined by the controller 1210. The controller 1210 retrieves 16K bytes of data, from the array of random data 1220, starting at determined address. The 16K bytes of data form the reduced array. The reduced array is then utilized substantially similar to the array of random data 1220 described above. The reduced array is not limited to only 16K. The reduced array can be any size. Other methods of selecting the reduced array may also be utilized including a preset starting address, a starting address derived from the key code, a pre-selected distribution of bytes throughout the array of random data 1220 or any other method suitable to select a plurality of bytes from the array of random data 1220.

The reduced array provides advantages in processor speed and memory utilization since the array is smaller than the larger array of random data 1220. The reduced array may also be efficiently distributed to a second processor or decryptor, thereby avoiding distribution of the complete array of random data 1220. This is particularly advantageous when distributing the array via an electronic network or computer network having a limited bandwidth. An additional advantage of the reduced array is allowing distribution of the array of random data 1220, in portions without distributing the entire array of random data 1220. This increases the security of the array of random data 1220 since the complete array of random data 1220 is not distributed at any single time.

A racetrack array is another embodiment of the reduced array of random data. In the racetrack array, the reduced array is "looped" so that the first byte in the reduced array immediately follows the last byte in the reduced array. The racetrack array has the advantage over the reduced array, described above, of being utilized substantially similar to a larger array such as the array of random data 1220. A racetrack array is used substantially like an infinite length array. For example, if the racetrack array contains 16K bytes of data and the address that is sought is address 24,976. First, one 16K "lap" around the racetrack, 16,384 bytes is subtracted from the 24,976. The result is 11592. Second, the controller starts from the first computed address and goes to address 11592. An additional advantage of the racetrack array is the ability to utilize a preset starting address such as byte 0 or any other preset address. This reduces a portion of the information and processing required by the control bytes during the encryption/decryption functions. The starting address for a racetrack array is limited in that the same starting address can not be utilized in two consecutive iterations of the racetrack array. For example, if, in the first iteration, byte 0 is utilized as the starting address, then for the second iteration, any byte other than byte 0 can be utilized.

In another embodiment of the present invention, the array may be distributed to a plurality of encryption and decryption sites. In such an embodiment, the level of security of the encryption process relies upon the level of security of the key codes utilized. As will be appreciated by those skilled in the art, the above described encryption processes can be operated in both half-duplex as described or in full duplex operation.

Figure 14:
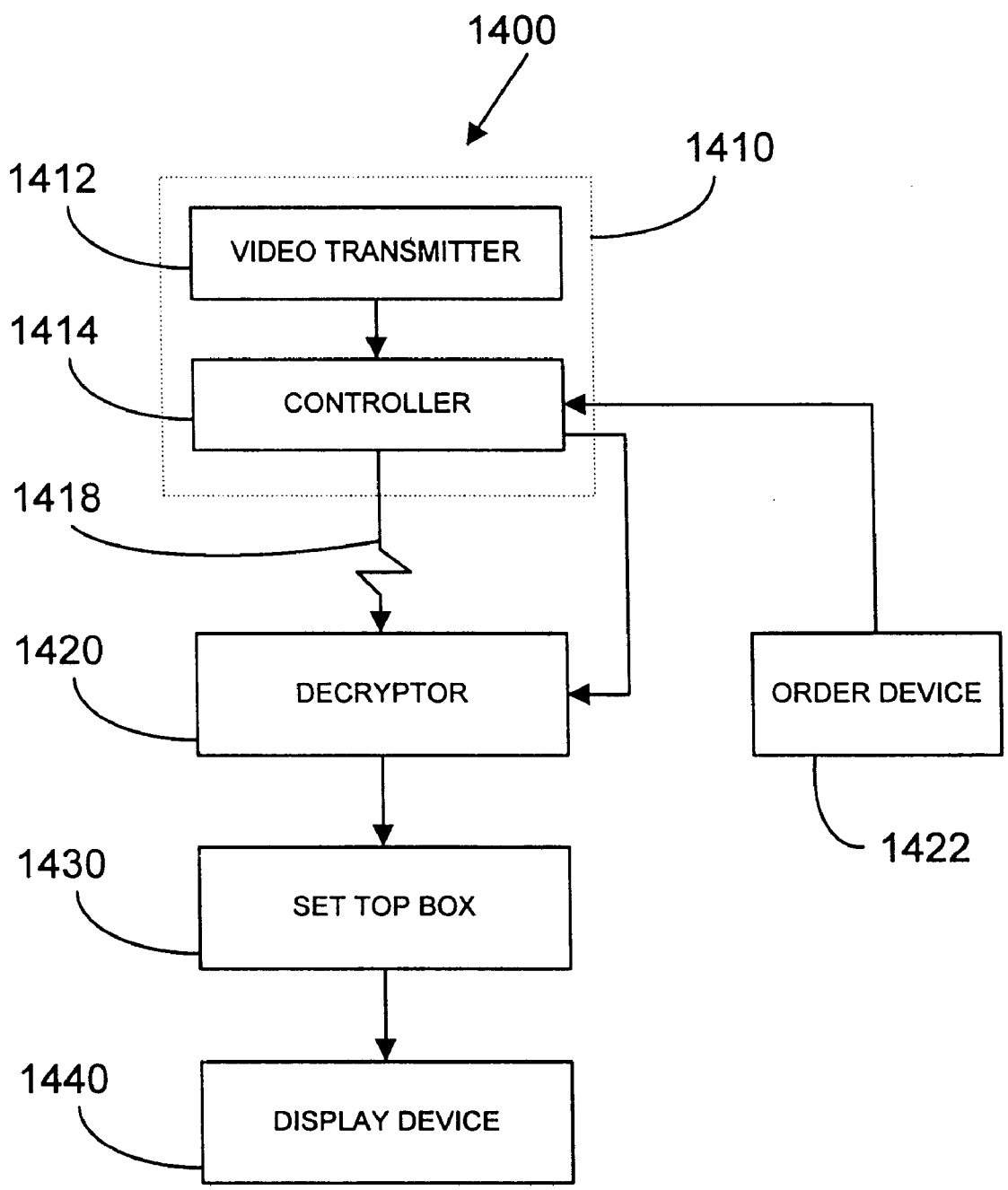
FIG. 14 is a block diagram of a video delivery system utilizing the security unit.

In another embodiment, the security unit is a component of a video/audio delivery system. FIG. 14 illustrates a video/audio system 1400 embodiment of the present invention. The video/audio delivery system 1400 includes a video signal source 1410, a distribution network 1418, a decryptor 1420, an order device 1422, a set top box 1430 and a display device 1440. The video signal source 1410 includes a video transmitter 1412 and a controller 1414.

The video system 1400 operates as follows: First, an encrypted video program is selected by the user, utilizing the set top box 1430. The user then places an order for the encrypted video program via the order device 1422. In one embodiment the order device is a common telephone. In such an embodiment, the user dials an order placement telephone number, selects the encrypted video program and enters a key code such as his credit card number and a number identifying the decryptor 1420 to complete the order. In an alternative embodiment, the selected video program can be encrypted before the user placed the order for the program. In still another embodiment, the user can provide his order information to an operator or any other method of initiating the order. In embodiments where the selected video program is previously encrypted, or where the user does not directly initiate the encryption process, the key codes can be provided by an operator, or a computer program or any other method described above to enter key codes.

In an embodiment where the selected video program is encrypted when the user orders the selected video program, the controller 1414 then encrypts the ordered video program using the key codes in a process as described above. In the encryption process, the controller 1414 selects a reduced array or a racetrack array as described above to utilize for the encryption process. The controller 1414 then transmits the reduced array or racetrack array to the decryptor 1420. The transmission may be via any electronic network such as a telephone, the distribution network 1418, a computer network, or any other electronic network. Next, the controller 1414 retrieves the control bytes as described above, from the reduced or racetrack array. The controller 1414 then determines the encryption/decryption algorithms to be utilized.

In one embodiment, the controller 1414 also transmits the control bytes to the decryptor 1420. In another embodiment, the controller 1414 also transmits the encryption/decryption algorithms to the decryptor 1420. In still another embodiment, the encryption/decryption algorithms are already part of the decryptor 1420. The decryptor 1420 receives the reduced array or racetrack array and the control bytes and the encrypted signal. The decryptor 1420 decrypts the signal as described above.

The encrypted video signal source 1410 can be any digital video signal source such as a satellite television signal, a cable television signal, a wireless cable television signal, a closed circuit television signal, a high definition television signal, streaming video signal or any equivalent television or other signal source which may be interpreted into a video-type display. Conventional analog video and analog audio signals can also be utilized in the video signal source but must first be converted to digital signals before being encrypted.

The set top box 1430 can be any conventional television decoder/receiver box which are well known in the art. Examples include analog and digital cable television decoders, digital or analog satellite receivers, digital or analog microwave receivers, high definition television receivers and a computer delivering streaming video broadcast from the internet or any other source.

The decryptor 1420 includes any of the embodiments of the encryptor/decryptor described above. Display device 1440 may be a monitor, LCD, HD receiver, computer with a display or any other method of utilizing a signal which may be interpreted into a video-type display. The order device 1422 can be any input device capable of entering an order at the video signal source 1410. Examples of the order device 1422 include a telephone, a computer, or any other input device described above.

The set top box 1430 and the decryptor 1420 may be arranged in several various configurations. The signal from the video source 1410 can be input to the decryptor 1420 first and then input to the set top box 1430, as illustrated in FIG. 14. In an alternative embodiment, the signal from the video source 1410 can be input to the set top box 1430 first and then input to the decryptor 1420.

In yet another alternative embodiment, the decryptor 1420 can be utilized external of the direct signal path of the video signal. In such an alternative embodiment, the signal from the video source 1410 is input to the set top box 1430. The video signal output of the set top box 1430 is fed directly to the display device 1440. The decryptor 1420 is electrically linked to the set top box 1430. In this embodiment, the set top box 1430 is capable of both sending and receiving signals to the video signal source 1410. The decryptor 1420 provides the decryption schema to the set top box 1430 to decrypt the signal.

The distribution network 1418 and the connections between the decryptor 1420, the set top box 1430 and the display device 1440 may be via cable, microwave, wireless, infra red (IR), digital, networked via a local area network (LAN) protocol, wide area network (WAN) protocol, Internet (IP) protocol, Ethernet or any other method of providing the signals for the connections to and from the video system 1400 components. In an alternative embodiment, the distribution network 1418 includes a secure encryption using secure sockets layer or other similar security technology to distribute the control bytes, encryption/decryption algorithms and the reduced array or racetrack array to the decryptor 1420.

Yet another embodiment of the present invention integrates the set top box 1430 and the decryptor 1420 in one component. Further integration of the present invention includes integrating the set top box 1430 and the decryptor 1420 into the television 1440.

Figure 15:
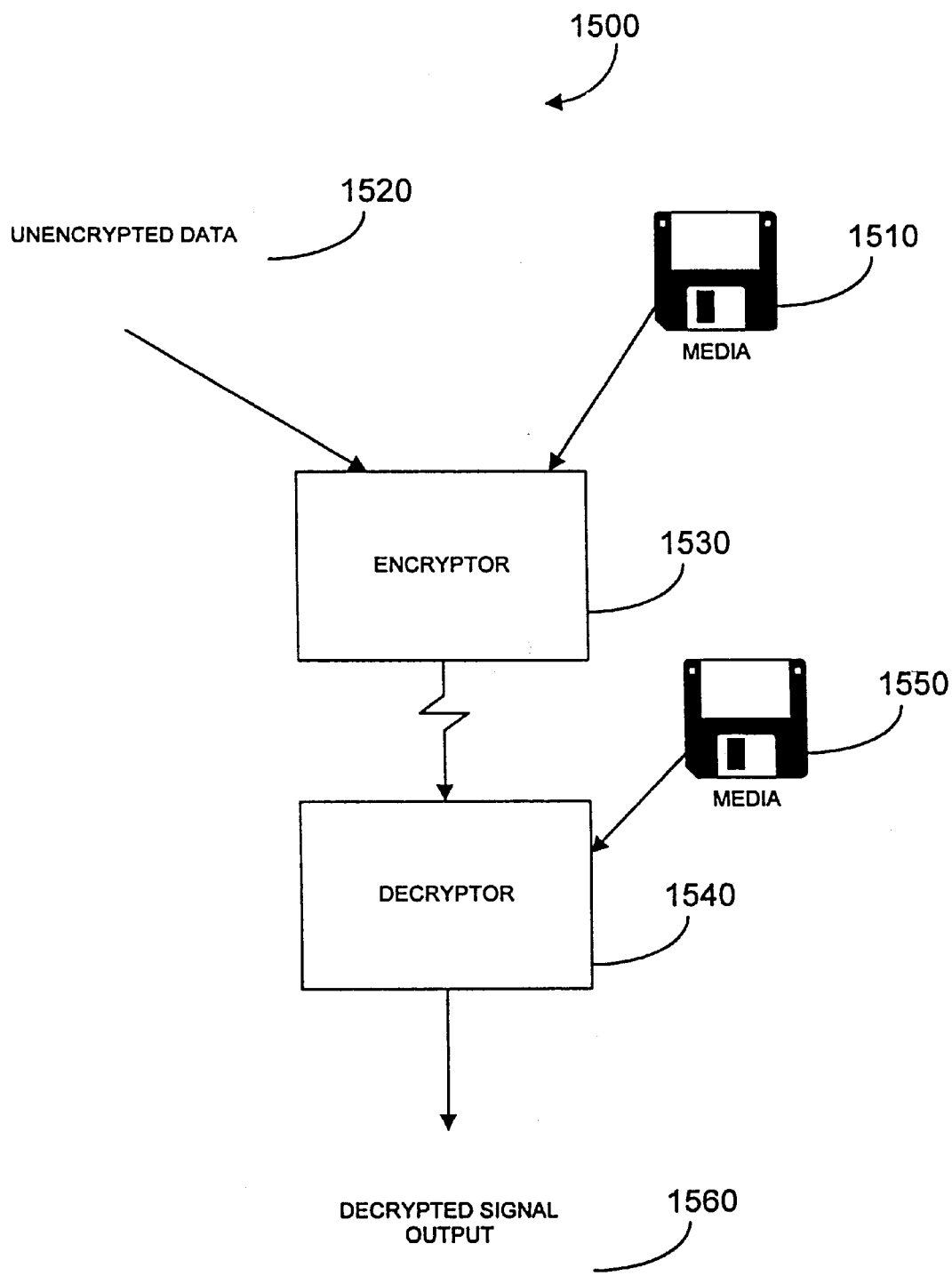
FIG. 15 is a block diagram of a data encryption system utilizing an electronically readable media.

FIG. 15 illustrates another embodiment 1500 of the present invention. In this embodiment, the encryption/decryption system 1500 includes a first and second electronically readable media 1510, 1550 such as a magnetic media, optical media, magneto-optical media, CDROM, digital video disk (DVD), hard disk, or any other electronically readable media method. The first and second electronically readable media 1510, 1550 contains a random array. In an alternative embodiment, the first and second electronically readable media 1510, 1550 also include a plurality of encryption/decryption algorithms.

The encryptor 1530 includes the capability to read the first electronically readable media 1510 and to receive unencrypted data 1520. The encryptor 1530 reads the first electronically readable media 1510 and inputs the random array or a portion thereof and the encryption/decryption algorithm and then encrypts the unencrypted signal as described above to output an encrypted signal.

The encrypted signal is received by a decryptor 1540. The decryptor 1540 is also operable to read the second electronically readable media 1550. The second electronically readable media 1550 includes the same random array and plurality of encryption/decryption algorithms as the first electronically readable media 1510. The decryptor 1540 inputs the random array or a portion thereof and the decryption algorithms and then decrypts the encrypted signal to output decrypted data 1560 as described above. The decrypted data 1560 is then utilized for it's intended purpose.

As will be appreciated by those skilled in the art, the first and second electronically readable media 1510, 1550 can be the same electronically readable media which was transported or in some other manner was transferred from the encryptor 1530 to the decryptor 1540. The encryptor 1530 and the decryptor 1540 can be any method capable of performing these functions such as a general purpose computer, a special purpose computer.

Figure 16:
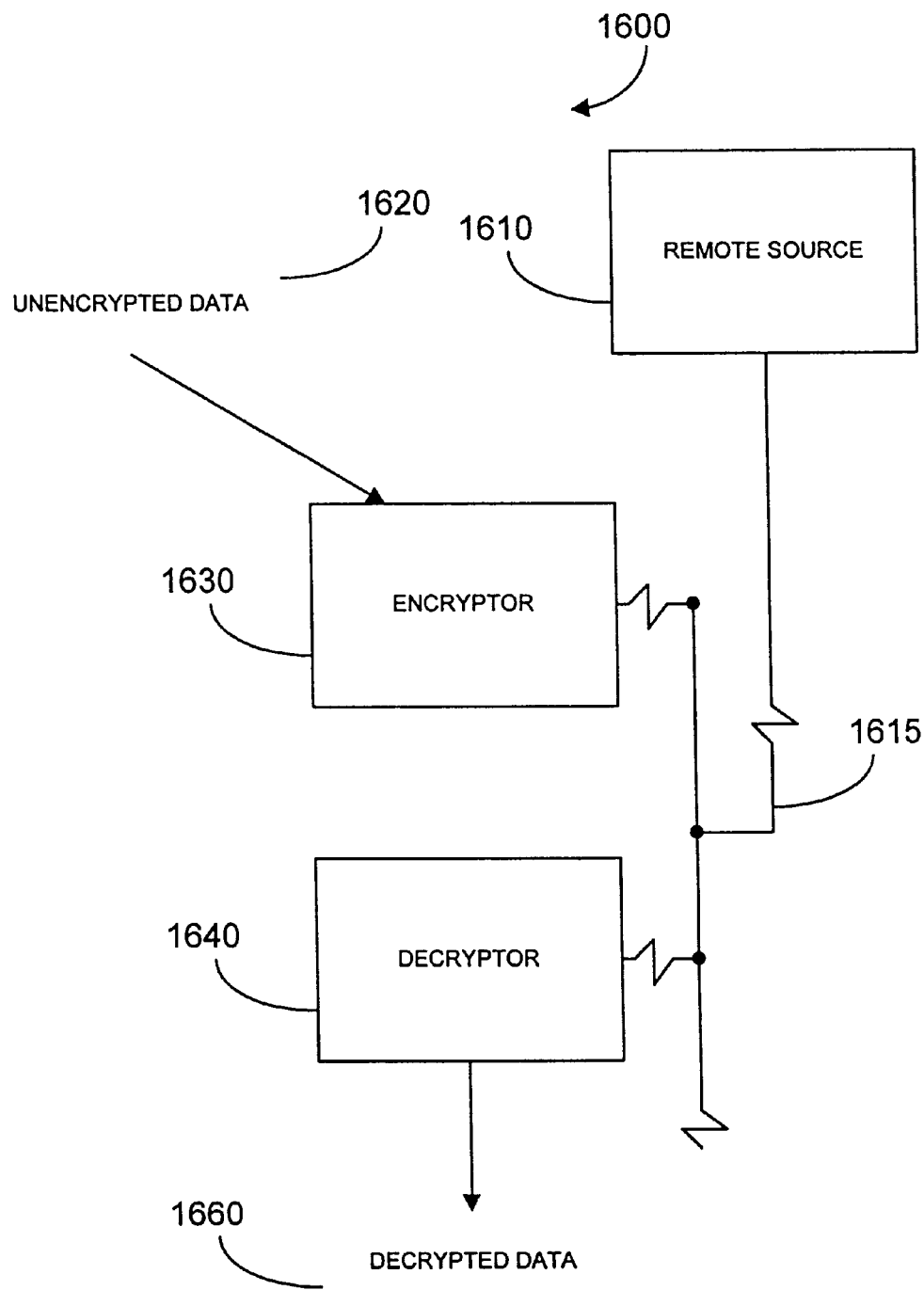
FIG. 16 is a block diagram of a data encryption system utilizing a computer network.

In still another alternative embodiment, the electronically readable media 1510, 1550 can represent a remote computer memory storage location which is accessible to the encryptor 1530 via a computer network such as the internet. FIG. 16 illustrates such an internet embodiment 1600, the encryptor 1630 accesses a random array and an encryption/decryption algorithms on an internet site, web page or other remote source 1610 via a computer network or an internet connection 1615. The encryptor 1630 downloads the random array or a portion thereof and an encryption/decryption algorithms from the remote source 1610 and into the encryptor 1630 memory. The encryptor 1630 then utilizes the random array or portion thereof and the encryption/decryption algorithms to process and encrypt a quantity of unencrypted data 1620. Then, through a transmission or transfer method such as a computer network or the internet 1615, the encrypted data is transferred to a decryptor 1640.

The decryptor 1640 downloads the random array or portion thereof and the encryption/decryption algorithms from the remote source 1610 and into the decryptor 1640 memory via a computer network or an internet connection 1615. The decryptor 1640 inputs the random array or a portion thereof and the encryption/decryption schema and then decrypts the encrypted signal to output decrypted data 1660. The decrypted data 1660 is then utilized for it's intended purpose.

It is therefore intended that the following appended claims be interpreted as including all permutations, alterations, additions, and equivalents as fall within the true spirit and scope of the present invention.

What is claimed is:

1. A data encryption method comprising:
    inputting a key code into a first processor, said first processor determining a first computed address and a control data length based upon said key code;
    retrieving a plurality of control data bytes stored at said first computed address in an array of random data, said array of random data stored on a first memory system;
    determining a second address and an encryption data length based upon said control data;
    retrieving a plurality of encryption data bytes stored at said second address in said first memory system;
    identifying at least one of a plurality of encryption/decryption algorithms based upon the control data;
    inputting a quantity of data into said first processor; and
    utilizing said encryption data and said identified encryption/decryption algorithm and said quantity of data to output a quantity of encrypted data.

2. A data encryption method as recited in claim 1, further comprising:
    inputting said key code into said first processor, said first processor determining said first computed address and said control data length based upon said key code;
    retrieving said plurality of control data bytes stored at said first computed address in an array of random data, said array of random data stored on a first memory system;
    determining said second address and said encryption data length based upon said control data;
    retrieving said plurality of encryption data bytes stored at said second address in said first memory system;
    identifying at least one of a plurality of encryption/decryption algorithms based upon the control data;
    inputting a quantity of encrypted data into said first processor; and
    utilizing said encryption data and said identified encryption/decryption algorithm and said quantity of encrypted data to output a quantity of decrypted data.

3. A data encryption method as recited in claim 2, wherein said first memory system includes a first electronically readable media accessible by said first processor, said first processor having said plurality of encryption/decryption algorithms stored within said first processor on a second electronically readable media.

4. A data encryption method as recited in claim 2, wherein said processor includes at least one of a first controller, a second controller, a first encryptor/decryptor and a second encryptor/decryptor.

5. A data encryption method as recited in claim 4, wherein said first controller is coupled to at least one of said second controller, said first encryptor/decryptor and said second encryptor/decryptor via an electronic network.

6. A data encryption method as recited in claim 5, further comprising:
    inputting a key code into said second controller, said second controller determining a first computed address and a control data length based upon said key code;
    retrieving a plurality of control data bytes stored at said first computed address in an array of random data, said array of random data stored on a first memory system;
    determining a second address and an encryption data length based upon said control data;
    retrieving a plurality of encryption data bytes stored at said second address in said first memory system;
    identifying at least one of a plurality of encryption/decryption algorithms based upon the control data;
    inputting a quantity of data into said second controller;
    utilizing said encryption data and said identified encryption/decryption algorithm and said quantity of data to output a quantity of encrypted data; and
    transmitting said encrypted data to said first controller, wherein said transmitting of encrypted data to said first controller is performed simultaneously with the output of encrypted data from said first controller.

7. A data encryption method as recited in claim 6, wherein said computer network supports at least one of Ethernet, Internet (IP) protocol, WAN protocol and LAN protocol.

8. A data encryption method as recited in claim 6, wherein said computer network includes at least one of cable, microwave, wireless, LASER and infra red (IR) connections.

9. A method to encrypt and decrypt video as recited in claim 8, wherein said reduced array includes a racetrack array.

10. A data encryption method as recited in claim 4, wherein said first controller is coupled to at least one of said second controller, said first encryptoridecryptor and said second encryptor/decryptor via a computer network.

11. A data encryption method as recited in claim 4, wherein said first controller is coupled to at least one of said second controller, said first encryptor/decryptor and said second encryptor/decryptor via a wireless telephone network.

12. A data encryption method as recited in claim 2, wherein said first memory system includes at least one of a CDROM, DVD, hard disk, magneto-optical storage media, optical storage media, magnetic media, website and a computer memory storage location on a remote computer.

13. A data encryption method as recited in claim 1, wherein said array of random data is a reduced array.

14. A data encryption method as recited in claim 13, wherein said reduced array is a racetrack array.

15. A data encryption method as recited in claim 13, wherein said first processor outputs said reduced array via an electronic network.

16. A data encryption method as recited in claim 1, wherein said key code includes at least one of a public key and a private key.

17. A data encryption method as recited in claim 1, wherein said data includes at least one of analog video, analog audio, digital video, digital audio, analog data and digital information.

18. A method to encrypt and decrypt video comprising:
inputting a key code into a first processor, said first processor determining a first computed address and a control data length based upon said key code;
retrieving a reduced array from an array of random data;
retrieving a plurality of control data bytes stored at said first computed address in the reduced array;
determining a second address and an encryption data length based upon said control data;
retrieving a plurality of encryption data bytes stored at said second address in said reduced array;
identifying at least one of a plurality of encryption/decryption algorithms based upon the control data;
inputting a quantity of video data into said first processor;
utilizing said encryption data and said identified encryption/decryption algorithm and said quantity of data to output a quantity of encrypted video data;
transmitting said reduced array, said control data bytes and said encrypted video data to a second processor;
determining said second address and said encryption data length based upon said control data;
retrieving said plurality of encryption data bytes stored at said second address in said reduced array;
identifying at least one of a plurality of encryption/decryption algorithms based upon the control data;
inputting a quantity of encrypted video data into said second processor; and
utilizing said encryption data and said identified encryption/decryption algorithm and said quantity of encrypted video data to output a quantity of decrypted video data.

19. A data encryption method comprising:
inputting a key code into a first processor, said first processor determining a first computed address and a control data length based upon said key code;
retrieving a plurality of control data bytes stored at said first computed address in an array of random data, said array of random data stored on a first electronically readable media, wherein said first electronically readable media includes at least one of a CDROM, DVD, hard disk, magneto-optical storage media, optical storage media, magnetic media;
determining a second address and an encryption data length based upon said control data;
retrieving a plurality of encryption data bytes stored at said second address in said random array of data;
identifying at least one of a plurality of encryption/decryption algorithms based upon the control data;
inputting a quantity of data into said first processor;
utilizing said encryption data and said identified encryption/decryption algorithm and said quantity of data to output a quantity of encrypted data, said encrypted data transmitted via a computer network to a second processor;
inputting said key code into said second processor, said second processor determining said first computed address and said control data length based upon said key code;
retrieving said plurality of control data bytes stored at said first computed address in an array of random data, said array of random data stored on a second electronically readable media, wherein said second electronically readable media includes at least one of a CDROM, DVD, hard disk, magneto-optical storage media, optical storage media, magnetic media;
determining said second address and said encryption data length based upon said control data;
retrieving said plurality of decryption data bytes stored at said second address in said array of random data;
identifying at least one of a plurality of encryption/decryption algorithms based upon the control data;
inputting a quantity of encrypted data into said first processor; and
utilizing said decryption data and said identified encryption/decryption algorithm and said quantity of encrypted data to output a quantity of decrypted data.

20. A data encryption method comprising:
inputting a key code into a first processor, said first processor determining a first computed address and a control data length based upon said key code;
retrieving a plurality of control data bytes stored at said first computed address in an array of random data, said array of random data stored on an electronically readable media, wherein said electronically readable media includes at least one of a website and a computer memory storage location on a remote computer, wherein said electronically readable media is coupled to said first processor via a computer network;
determining a second address and an encryption data length based upon said control data;
retrieving a plurality of encryption data bytes stored at said second address in said array of random data;
identifying at least one of a plurality of encryption/decryption algorithms based upon the control data;
retrieving said identified encryption/decryption algorithm from said electronically readable media;
inputting a quantity of data into said first processor;
utilizing said encryption data and said identified encryption/decryption algorithm and said quantity of data to output a quantity of encrypted data, said encrypted data transmitted via a computer network to a second processor;
inputting said key code into said second processor, said second processor determining said first computed address and said control data length based upon said key code;

retrieving said plurality of control data bytes stored at said first computed address in an array of random data, said array of random data stored on said electronically readable media;

determining said second address and said encryption data length based upon said control data;

retrieving said plurality of decryption data bytes stored at said second address in said array of random data;

identifying at least one encryption/decryption algorithm based upon the control data; retrieving said identified encryption/decryption algorithm from said electronically eadable media;

inputting a quantity of encrypted data into said second processor; and utilizing said decryption data and said identified encryption/decryption algorithm and said quantity of encrypted data to output a quantity of decrypted data.

\* \* \* \* \*